(12) United States Patent
Tabata et al.

(10) Patent No.: US 7,618,343 B2
(45) Date of Patent: Nov. 17, 2009

(54) CONTROL APPARATUS FOR VEHICULAR DRIVE SYSTEM

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 366 days.

(21) Appl. No.: 11/441,109

(22) Filed: May 26, 2006

(65) Prior Publication Data

US 2007/0111854 A1 May 17, 2007

(30) Foreign Application Priority Data

May 27, 2005 (JP) ............................... 2005-156480

(51) Int. Cl.
*B60K 1/02* (2006.01)
(52) U.S. Cl. ................................ 477/3; 475/5; 475/219
(58) Field of Classification Search .................. 475/219; 477/3
See application file for complete search history.

(56) References Cited

U.S. PATENT DOCUMENTS

| 6,146,302 | A | 11/2000 | Kashiwase | |
| 7,179,186 | B2 * | 2/2007 | Bucknor et al. | 475/5 |
| 7,322,902 | B2 * | 1/2008 | Tabata et al. | 477/5 |

FOREIGN PATENT DOCUMENTS

| JP | 11-217025 | 8/1999 |
| JP | 2000-346169 | 12/2000 |
| JP | 2003-130202 A | 5/2003 |
| JP | 2005-348532 A | 12/2005 |

\* cited by examiner

*Primary Examiner*—Roger L Pang
*Assistant Examiner*—Derek D Knight
(74) *Attorney, Agent, or Firm*—Oblon, Spivak, McClelland, Maier & Neustadt, L.L.P.

(57) ABSTRACT

A control apparatus for a vehicular drive system provided with a continuously-variable transmission portion operable as an electrically controlled continuously variable transmission, and a step-variable transmission portion, the continuously-variable transmission portion having a differential mechanism operable to distribute an output of an engine to a first electric motor and a power transmitting member, and a second electric motor disposed in a power transmitting path between the power transmitting member and a drive wheel of a vehicle, the control apparatus including a continuous-transmission control device including a first shifting control portion for controlling a speed ratio of the continuously-variable transmission portion, so as to prevent a change of a speed of the engine due to a change of an input speed of the step-variable transmission portion upon a shifting action of the step-variable transmission portion, and second shifting control portion for controlling the speed ratio of the continuously-variable transmission portion independently of the shifting action of the step-variable transmission portion, the continuous-transmission control means selectively activating the first shifting control portion and the second shifting control portion, on the basis of a manner in which an overall speed ratio of the transmission mechanism is changed.

22 Claims, 18 Drawing Sheets

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | SPREAD 4.76 |
| R |  |  | ○ |  |  |  | ○ | 3.209 |  |
| N |  | ○ |  |  |  |  |  |  |  |

○ ENGAGED

◎ ENGAGED FOR STEP-VARIABLE SHIFTING, AND RELEASED FOR CONTINUOUSLY-VARIABLE SHIFTING

| | C0 | C1 | C2 | B0 | B1 | B2 | SPEED RATIO | STEPPING RATIO |
|---|---|---|---|---|---|---|---|---|
| 1st | ◉ | ○ | | | | ○ | 2.804 | 1.54 |
| 2nd | ◉ | ○ | | | ○ | | 1.531 | 1.53 |
| 3rd | ◉ | ○ | ○ | | | | 1.000 | 1.42 |
| 4th | | ○ | ○ | ◉ | | | 0.705 | SPREAD 3.977 |
| R | | | ○ | | | ○ | 2.393 | |
| N | | ○ | | | | | | |

○ ENGAGED
◉ ENGAGED FOR STEP-VARIABLE SHIFTING, AND RELEASED FOR CONTINUOUSLY-VARIABLE SHIFTING

CONTROL APPARATUS FOR VEHICULAR DRIVE SYSTEM

The present application is based on Japanese Patent Application No. 2005-156480.

TECHNICAL FIELD

1. Field of the Invention

The present invention relates to a vehicular drive system including two transmission mechanisms consisting of a continuously variable transmission and another transmission, and more particularly a control of an overall speed ratio of the vehicular drive system which is determined by the speed ratio of the continuously variable transmission and the speed ratio of the above-indicated another transmission.

2. Discussion of Prior Art

There is known a vehicular drive system including two transmission mechanisms consisting of a continuously variable transmission and another transmission, and wherein an output of a drive power source is transmitted to drive wheels of a vehicle through those two transmission mechanisms. Generally, the overall speed ratio of the vehicular drive system of this type is determined by the speed ratios of the two transmission mechanisms.

As one example of the above-indicated continuously variable transmission, there is known a drive system which includes a differential mechanism operable to distribute an output of an engine to a first electric motor and an output shaft and further includes a second electric motor disposed between the output shaft of the differential mechanism and the drive wheels, and which functions as an electrically controlled continuously variable transmission. An example of such a drive system is a drive system for a hybrid vehicle disclosed in Patent Document 1. In this hybrid vehicle drive system, the differential mechanism is constituted by a planetary gear set, and a major portion of a drive force of the engine is transmitted to the drive wheels by a differential function of the differential mechanism, and the remaining portion of the drive force of the engine is electrically transmitted through an electric path between the first electric motor and the second electric motor, so that the drive system functions as an electrically controlled continuously variable transmission the speed ratio of which is continuously variable and which is controlled by a control apparatus to drive the vehicle while the engine is kept in its optimum operating condition, for thereby improving the fuel economy of the vehicle.

As an example of the above-indicated transmission, there is known a step-variable automatic transmission (hereinafter referred to as "step-variable transmission") having a plurality of forward-drive gear positions such as four, five or six gear positions, which are selectively established by connecting selected rotary elements of a plurality of planetary gear sets to each other by hydraulically operated frictional coupling devices. With the gear positions selectively established, the speed ratio of the step-variable transmission of this type is changed non-continuously, that is, in steps, so that the vehicle drive torque is variable in steps.

The hybrid vehicle drive system disclosed in the above-indicated Patent Document 1 is known as an example of the above-described vehicular drive system including the two transmission mechanism, wherein the above-described step-variable transmission is provided in a power transmitting path between the output shaft of the differential mechanism (electrically controlled continuously variable transmission) and the drive wheels, for the purpose of reducing the required capacity of the above-described second electric motor when a large vehicle drive torque is required. The drive system thus constructed is controlled such that the step-variable transmission is shifted to the selected gear position according to the vehicle drive torque required (hereinafter referred to as "required vehicle drive torque"), so that in the selected gear position of the step-variable transmission, the drive system as a whole functions as an electrically controlled continuously variable transmission, enabling the vehicle to be driven with the engine kept in its optimum operating condition.

Patent Document 1 JP-2003-130202 A

When the drive system as a whole functions as the electrically controlled continuously variable transmission, however, a continuous change of the overall speed ratio determined by the speed ratio of the electrically controlled continuously variable transmission and the speed ratio of the step-variable transmission may require a relatively long shifting time and deteriorate the shifting response, depending upon the specific change of the overall speed ratio in response to the required vehicle drive torque, for instance, where the overall speed ratio is changed by a relatively large amount in response to a relatively large amount of increase of the required vehicle drive torque.

The present invention was made in view of the background art described above. It is therefore an object of this invention to provide a control apparatus for a vehicular drive system including a continuously variable transmission and another transmission, which control apparatus is arranged to improves the shifting response of the vehicular drive system.

SUMMARY OF THE INVENTION

The present invention according to claim 1 provides a control apparatus for (a) a vehicular drive system provided with a transmission mechanism constituted by a continuously-variable transmission portion operable as an electrically controlled continuously variable transmission, and a transmission portion, the continuously-variable transmission portion having a differential mechanism operable to distribute an output of an engine to a first electric motor and a power transmitting member, and a second electric motor disposed in a power transmitting path between the power transmitting member and a drive wheel of a vehicle, the transmission portion constituting a part of the power transmitting path, the control apparatus being characterized by comprising (b) continuous-transmission control means including first shifting control means for controlling a speed ratio of the continuously-variable transmission portion, so as to prevent a change of a speed of the engine due to a change of an input speed of the transmission portion upon a shifting action of the transmission portion, and second shifting control means for controlling the speed ratio of the continuously-variable transmission portion independently of the shifting action of the transmission portion, the continuous-transmission control means selectively activating the first shifting control means and the second shifting control means, on the basis of a manner in which an overall speed ratio of the transmission mechanism constituted by the continuously-variable transmission portion and the transmission portion is changed.

In the control apparatus constructed as described above, the continuous-transmission control means selectively activates the first shifting control means and the second shifting control means, on he basis of the manner of change of the overall speed ratio of the transmission mechanism, upon a shifting action of the transmission portion. The first shifting control means is arranged to control the speed ratio of the continuously-variable transmission portion, so as to prevent a change of the engine speed, and the second shifting control means is arranged to control the speed ratio of the continuously-variable transmission portion independently of the shifting action of the transmission portion, so that the overall speed ratio can be changed in steps during the shifting action of the transmission portion, as in a step-variable transmission, whereby the shifting response is improved.

When the speed ratio of the continuously-variable transmission portion is controlled by the second shifting control means, for example, the overall speed ratio is changed in steps during the shifting action of the transmission portion, such that the amount of change of the speed ratio of the continuously-variable transmission portion is added to (or subtracted from) the amount of stepping change of the speed ratio of the transmission portion, so that the shifting response is made higher in this case of stepping change of the overall speed ratio, than in the case where the change of the overall speed ratio is restricted. When the speed ratio of the continuously-variable transmission portion is controlled by the first shifting control means, on the other hand, the speed ratio of the continuously-variable transmission portion is changed so as to restrict the amount of change of the overall speed ratio, in spite of the stepping change of the speed ratio of the transmission portion, so that the shifting shock is reduced, and the transmission mechanism as a whole functions as a continuously-variable transmission, whereby the fuel economy is improved.

In the invention according to claim 2, the continuous-transmission control means activates the first shifting control means when the overall speed ratio of the transmission mechanism is changed continuously, and activates the second shifting control means when the overall speed ratio of the transmission mechanism is changed non-continuously. In this case, the shifting response is improved when the overall speed ratio is changed non-continuously, that is, in steps, during the shifting action of the transmission portion.

The invention according to claim 3 provides a control apparatus for (a) a vehicular drive system provided with a transmission mechanism constituted by a differential portion having a differential mechanism operable to distribute an output of an engine to a first electric motor and a power transmitting member, and a second electric motor disposed in a power transmitting path between the power transmitting member and a drive wheel of a vehicle, and a transmission portion which constitutes a part of the power transmitting path, the control apparatus being characterized by comprising (b) continuous-transmission control means including first shifting control means for controlling a speed ratio of the continuously-variable transmission portion, so as to prevent a change of a speed of the engine due to a change of an input speed of the transmission portion upon a shifting action of the transmission portion, and second shifting control means for controlling the speed ratio of the continuously-variable transmission portion independently of the shifting action of the transmission portion, the continuous-transmission control means selectively activating the first shifting control means and the second shifting control means, on the basis of a manner in which an overall speed ratio of the transmission mechanism constituted by the continuously-variable transmission portion and the transmission portion is changed.

In the control apparatus constructed as described above, the continuous-transmission control means selectively activates the first shifting control means and the second shifting control means, on he basis of the manner of change of the overall speed ratio of the transmission mechanism, upon a shifting action of the transmission portion. The first shifting control means is arranged to control the speed ratio of the differential portion, so as to prevent a change of the engine speed, and the second shifting control means is arranged to control the speed ratio of the differential transmission portion independently of the shifting action of the transmission portion, so that the overall speed ratio can be changed in steps during the shifting action of the transmission portion, as in a step-variable transmission, whereby the shifting response is improved.

When the speed ratio of the differential portion is controlled by the second shifting control means, for example, the overall speed ratio is changed in steps during the shifting action of the transmission portion, such that the amount of change of the speed ratio of the differential portion is added to (or subtracted from) the amount of stepping change of the speed ratio of the transmission portion, so that the shifting response is made higher in this case of stepping change of the overall speed ratio, than in the case where the change of the overall speed ratio is restricted. When the speed ratio of the differential portion is controlled by the first shifting control means, on the other hand, the speed ratio of the differential portion is changed so as to restrict the amount of change of the overall speed ratio, in spite of the stepping change of the speed ratio of the transmission portion, so that the shifting shock is reduced, and the transmission mechanism as a whole functions as a continuously-variable transmission, whereby the fuel economy is improved.

In the invention according to claim 4, the continuous-transmission control means activates the first shifting control means when the overall speed ratio of the transmission mechanism is changed continuously, and activates the second shifting control means when the overall speed ratio of the transmission portion is changed non-continuously. In this case, the shifting response is improved when the overall speed ratio is changed non-continuously, that is, in steps, during the shifting action of the transmission portion.

The invention according to claim 5 provides a control apparatus for (a) a vehicular drive system provided with a continuously-variable transmission portion disposed as a continuously variable transmission in a power transmitting path through which an output of an engine is transmitted to a drive wheel of a vehicle, and a transmission portion which constitutes a part of the power transmitting path and which is connected to the continuously-variable transmission portion, the control apparatus being characterized by comprising (b) continuous-transmission control means for controlling a speed ratio of the continuously-variable transmission portion upon a shifting action of the transmission portion, in a control mode switchable between a continuous mode in which an overall speed ratio defined by the continuously-variable transmission portion and the transmission portion is changed continuously, and a non-continuous mode in which the overall speed ratio is changed non-continuously.

In the control apparatus constructed as described above, the continuous-transmission control means controls the speed ratio of the continuously-variable transmission portion upon a shifting action of the transmission portion, such that the control mode is switchable between the continuous mode in which the overall speed ratio is changed continuously, and the non-continuous mode in which the overall speed ratio is changed non-continuously, so that the overall speed ratio can be changed in steps during the shifting action of the transmission portion, as in a step-variable transmission, whereby the shifting response is improved.

When the speed ratio of the continuously-variable transmission portion is controlled such that the overall speed ratio is changed non-continuously upon the shifting action of the transmission portion, for example, the stepping change of the speed ratio of the transmission portion is utilized to cause the overall speed ration to be changed in steps during the shifting action of the transmission portion, so that the shifting response is made higher in this case of the stepping change of the overall speed ratio, than in the case where the continuous change of the overall speed ratio. When the speed ratio of the continuously-variable transmission portion is controlled such that the overall speed ratio is changed continuously, on the other hand, the speed ratio of the continuously-variable transmission portion is changed so as to restrict the amount of change of the overall speed ratio, in spite of the stepping change of the speed ratio of the transmission portion, so that the shifting shock is reduced, and the vehicular drive system as a whole functions as a continuously-variable transmission, whereby the fuel economy is improved.

Preferably, the continuously-variable transmission portion described above includes a differential mechanism operable to distribute an output of an engine to a first electric motor and a power transmitting member, and a second electric motor disposed in a power transmitting path between the power transmitting member and a drive wheel of a vehicle, and is operable as an electrically controlled continuously variable transmission. In this case, the speed ratio of the continuously-variable transmission is changed to drive the vehicle with the engine held in an optimum operating condition for improving the fuel economy.

Preferably, the transmission portion is a step-variable automatic transmission. In this case, the overall speed ratio can be changed in steps in the process of the shifting action of the transmission portion. That is, the overall speed ratio is changed at a higher rate during the shifting action of the transmission portion, when the overall speed ratio is changed in steps, than when the overall speed ratio is changed continuously. Accordingly, the continuous-transmission control means enables the drive system as a whole to function as a continuously variable transmission for smoothly changing the vehicle drive torque, or to change the overall speed ratio in steps for rapidly changing the vehicle drive torque.

Preferably, the differential mechanism includes a differential-state switching device operable to place the continuously-variable transmission portion selectively in a continuously-variable shifting state in which the continuously-variable transmission portion is operable as the electrically controlled continuously variable transmission, and a step-variable shifting state in which the continuously-variable transmission portion is not operable as the electrically controlled continuously variable transmission. In this case, the continuously-variable transmission portion of the vehicular drive system is controlled by the differential-state switching device such that the continuously-variable transmission portion is placed in a selected one of the continuously-variable shifting state in which the continuously-variable transmission portion is operable as the electrically controlled continuously variable transmission, and the step-variable shifting state in which the continuously-variable transmission portion is not operable as the electrically controlled continuously variable transmission. Accordingly, the vehicular drive system has both an advantage of an improved fuel economy of a transmission the speed ratio of which is electrically variable, and an advantage of a high power transmitting efficiency of a gear type power transmitting device constructed for mechanical power transmission. The fuel economy is improved when the continuously-variable transmission portion is placed in the continuously-variable shifting state while the vehicle is running at a low or medium speed or output with the engine operating in a normal output state, for example. When the continuously-variable transmission portion is placed in the step-variable shifting state for transmitting the engine output to the drive wheel primarily through a mechanical power transmitting path while the vehicle is running at a high speed, on the other hand, the fuel economy is reduced owing to reduction of a loss of conversion between mechanical and electric energies, which would take place when the vehicular drive system is operated as the transmission the speed ratio of which is electrically variable. The continuously-variable transmission portion is placed in the step-variable shifting state while the vehicle is running at a high output. That is, the vehicular drive system is operated as the transmission the speed ratio of which is electrically variable, only when the vehicle is running at the low or medium speed or output, making it possible to reduce the maximum amount of electric energy that can be generated by the electric motor, namely, the maximum amount of electric energy that should be supplied from the electric energy, whereby the required size of the electric motor and the required size of the vehicular drive system including the electric motor can be further reduced.

Preferably, the differential mechanism includes a differential-state switching device operable to place the differential mechanism selectively in a differential state in which the differential mechanism performs a differential function, and a locked state in which the differential mechanism does not perform the differential function. In this case, the differential mechanism is controlled by the differential-state switching device such that the differential mechanism is placed in a selected one of the differential state in which the differential mechanism performs the differential function, and the locked state in which the differential mechanism does not perform the differential function. Accordingly, the vehicular drive system has both an advantage of an improved fuel economy of a transmission the speed ratio of which is electrically variable, and an advantage of a high power transmitting efficiency of a gear type power transmitting device constructed for mechanical power transmission. The fuel economy is improved when the differential mechanism is placed in the differential state while the vehicle is running at a low or medium speed or output with the engine operating in a normal output state, for example. When the differential mechanism is placed in the locked state for transmitting the engine output to the drive wheel primarily through a mechanical power transmitting path while the vehicle is running at a high speed, on the other hand, the fuel economy is reduced owing to reduction of a loss of conversion between mechanical and electric energies, which would take place when the vehicular drive system is operated as the transmission the speed ratio of which is electrically variable. The differential mechanism is placed in the locked state while the vehicle is running at a high output. Thus, the vehicular drive system is operated as the transmission the speed ratio of which is electrically variable, only when the vehicle is running at the low or medium speed or output, making it possible to reduce the maximum amount of electric energy that can be generated by the electric motor, namely, the maximum amount of electric energy that should be supplied from the electric energy, whereby the required size of the electric motor and the required size of the vehicular drive system including the electric motor can be further reduced, Preferably, the differential-state switching device places the differential mechanism in the differential state to place the continuously-variable transmission portion in a continuously-variable shifting state in which the continuously-variable transmission portion is operable as the electrically controlled continuously variable transmission, and places the differential mechanism in the locked state to place the continuously-variable transmission portion in a step-variable shifting state in which the continuously-variable transmission portion is not operable as the electrically controlled continuously variable transmission. In this case, the continuously-variable transmission portion is switchable between the continuously-variable shifting state and the step-variable shifting state.

Preferably, the continuous-shifting control portion activates the first shifting control portion or the second shifting control portion while the continuously-variable transmission portion is placed in the continuously-variable shifting state. In this case, the speed ratio of the continuously-variable transmission portion is controlled by the first shifting control portion or the second shifting control portion.

Preferably, the continuous-shifting control portion activates the first shifting control portion or the second shifting control portion while the continuously-variable transmission portion is placed in the differential state. In this case, the speed ratio of the differential portion is controlled by the first shifting control portion or the second shifting control portion.

Preferably, the differential mechanism has a first element connected to the engine, a second element connected to the first electric motor and a third element connected to the power transmitting member, and the differential-state switching device is operable to place the differential mechanism in the differential state in which the first, second and third elements of the differential mechanism are rotatable relative to each other, and to place the differential mechanism in the locked state in which the first, second and third elements are rotated as a unit or the second element is held stationary. In this case, the differential mechanism is switchable between the differential state and the locked state.

Preferably, the differential-state switching device includes a clutch operable to connect any two of the first, second and third elements of the differential mechanism to each other for rotating the first, second and third elements as a unit, and/or a brake operable to fix the second element to a stationary member for holding the second element stationary. This arrangement permits the differential mechanism to be easily switched between the differential and non-differential states.

Preferably, the clutch and brake are released to place the differential mechanism in the differential state in which the first, second and third elements are rotatable relative to each other, and in which the differential mechanism is operable as an electrically controlled differential device, and the clutch is engaged to permit the differential mechanism to be operable as a transmission having a speed ratio of 1, or the brake is engaged to permit the differential mechanism to be operable as a speed-increasing transmission having a speed ratio lower than 1. In this arrangement, the differential mechanism is switchable between the differential state and the locked state, and is operable as a transmission having a single gear position with a single fixed speed ratio or a plurality of gear positions having respective fixed speed ratios.

Preferably the differential mechanism is a planetary gear set, and the first element is a carrier of the planetary gear set, and the second element is a sun gear of the planetary gear set, while said third element is a ring gear of the planetary gear set. In this arrangement, the axial dimension of the differential mechanism can be reduced, and is simply constituted by one planetary gear device.

Preferably, the planetary gear set is of a single-pinion type. In this case, the axial dimension of the differential mechanism can be reduced, and the differential mechanism is simply constituted by one planetary gear set of a single-pinion type.

Preferably, the overall speed ratio of the vehicular drive system is defined by the speed ratio of the continuously-variable transmission portion and he speed ratio of the transmission portion. In this case, the vehicle drive force can be obtained over a relatively wide range of the overall speed ratio, by utilizing the speed ratio of the transmission portion, so that the efficiency of the continuously-variable shifting control of the continuously-variable transmission portion is further improved.

Preferably, then overall speed ratio of the vehicular drive system is defined by the speed ratio of the differential portion and the speed ratio of the transmission portion. In this case, the vehicle drive force can be obtained over a relatively wide range of the overall speed ratio, by utilizing the speed ratio of the transmission portion.

The continuously-variable transmission portion placed in its continuously-variable shifting state and the step-variable transmission portion cooperate to constitute a continuously variable transmission, while the continuously-variable transmission portion placed in a shifting state inhibiting its electrically controlled continuously variable shifting operation and the step-variable transmission portion cooperate to constitute a step variable transmission.

DESCRIPTION OF PREFERRED EMBODIMENTS

The embodiments of this invention will be described in detail by reference to the drawings.

Embodiment 1

Figures 1, 2:
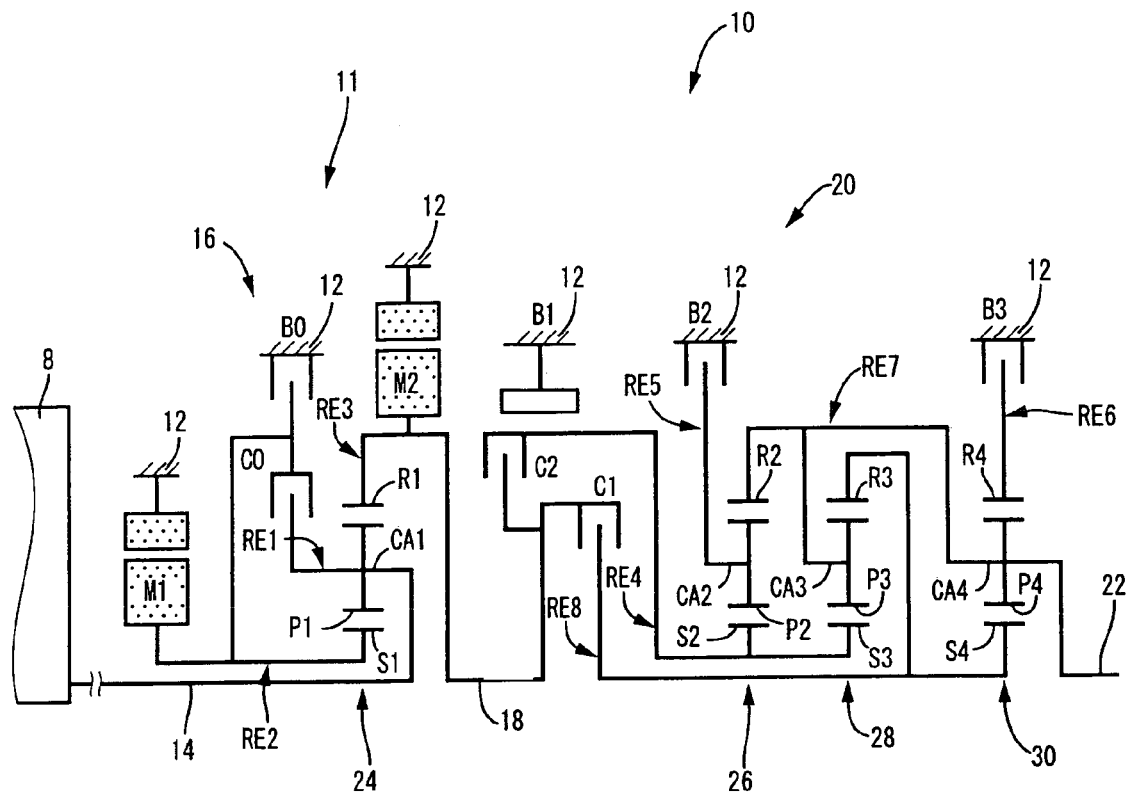
FIG. 1 is a schematic view showing an arrangement of a drive system of a hybrid vehicle, to which the present invention is applicable.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 5:
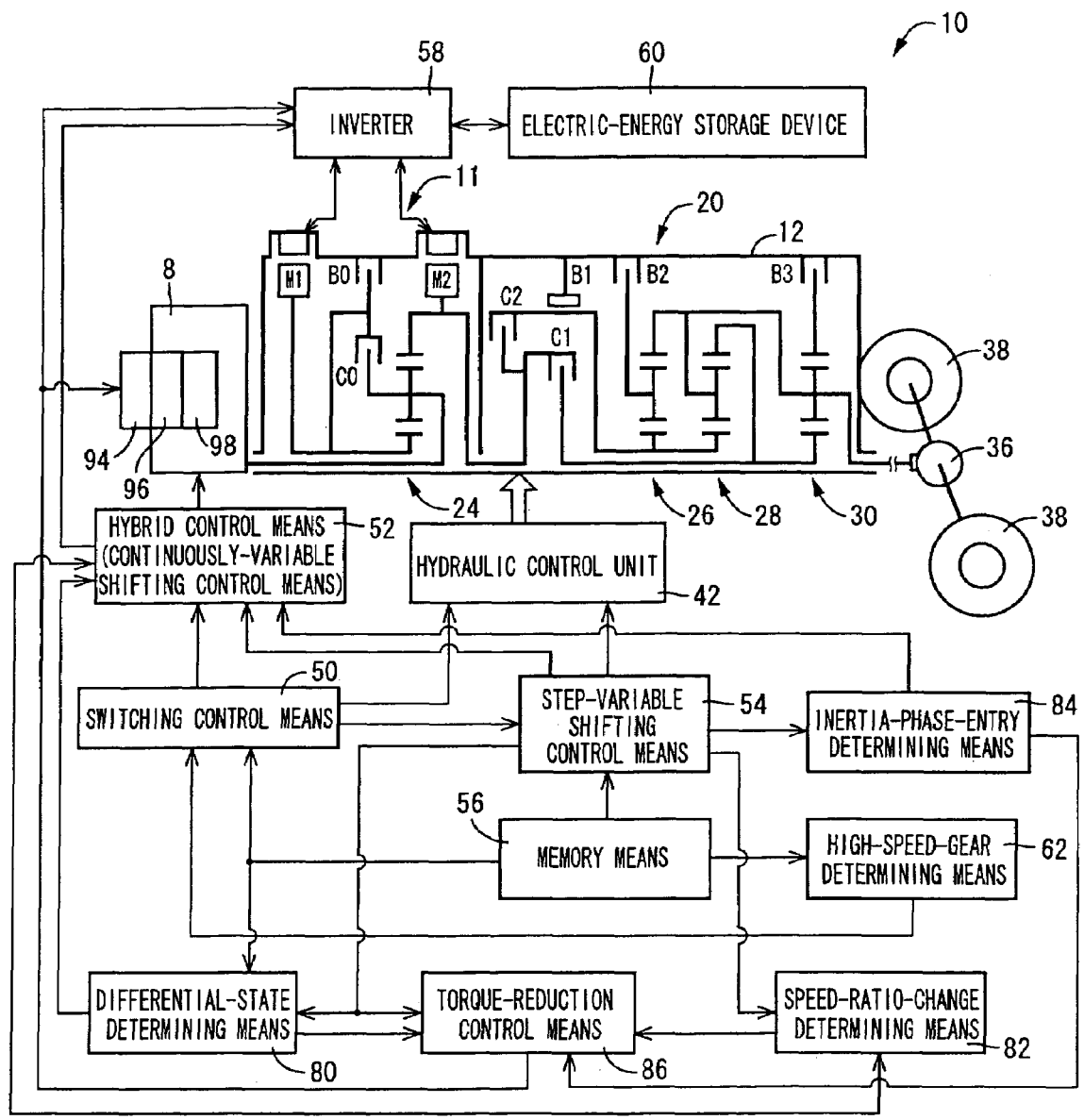
FIG. 5 is a functional block diagram illustrating major control functions of the electronic control device of FIG. 4.

Referring to the schematic view of FIG. 1, there is shown a transmission mechanism 10 constituting a part of a drive system for a hybrid vehicle, which drive system is controlled by a control apparatus according to one embodiment of this invention. In FIG. 1, the transmission mechanism 10 includes: an input rotary member in the form of an input shaft 14; a continuously-variable transmission portion 11 connected to the input shaft 14 either directly, or indirectly via a pulsation absorbing damper (vibration damping device) not shown; a step-variable or multiple-step transmission portion in the form of a step-variable transmission portion 20 disposed between the continuously-variable transmission portion 11 and drive wheels 38 of the vehicle, and connected in series via a power transmitting member 18 (power transmitting shaft) to the transmission portion 11 and the drive wheels 38; and an output rotary member in the form of an output shaft 22 connected to the step-variable transmission portion 20. The input shaft 12, continuously-variable transmission portion 11, step-variable transmission portion 20 and output shaft 22 are coaxially disposed on a common axis in a casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper. It is noted that a lower half of the transmission mechanism 10, which is constructed symmetrically with respect to its axis, is omitted in FIG. 1. This is also true to the other embodiments of the invention described below.

The continuously-variable transmission portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio $\rho 1$ of about 0.418, for example, a switching clutch C0 and a switching brake B1. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio $\gamma 0$ (rotating speed of the input shaft 14/rotating speed of the power transmitting member 18) of the power distributing mechanism 16 is continuously changed from a minimum value $\gamma 0 min$ to a maximum value $\gamma 0 max$, that is, in the continuously-variable shifting state in which the power distributing mechanism 16 functions as an electrically controlled continuously variable transmission the speed ratio γ0 of which is continuously variable from the minimum value γ0min to the maximum value γ0max.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the locked state in which the three rotary elements of the first planetary gear set 24 consisting of the first sun gear S1, first carrier CA1 and first ring gear R1 are rotatable as a unit, namely, placed in a non-differential state in which the differential function is not available, so that the continuously-variable transmission portion 11 is also placed in a non-differential state. In this non-differential state, the rotating speed of the engine 8 and the rotating speed of the power transmitting member 18 are made equal to each other, so that the continuously-variable transmission portion 11 (power distributing mechanism 16) is placed in a fixed-speed-ratio shifting state or step-variable shifting state in which the mechanism 16 functions as a transmission having a fixed speed ratio γ0 equal to 1.

When the switching brake B0 is engaged in place of the switching clutch C0, the first sun gear S1 is fixed to the casing 12, so that the power distributing mechanism 16 is placed in the locked state in which the first sun gear S1 is not rotatable, namely, placed in a second non-differential state in which the differential function is not available, so that the continuously-variable transmission portion 11 is also placed in the non-differential state. Since the rotating speed of the first ring gear R1 is made higher than that of the first carrier CA1, the continuously-variable transmission portion 11 is placed in the fixed-speed-ratio shifting state or step-variable shifting state in which continuously-variable transmission portion 11 (the power distributing mechanism 16) functions as a speed-increasing transmission having a fixed speed ratio γ0 smaller than 1, for example, about 0.7.

Thus, the frictional coupling devices in the form of the switching clutch C0 and brake B0 function as a differential-state switching device operable to selectively switch the continuously-variable transmission portion 11 (power distributing mechanism 16) between the differential state (namely, non-locked state) and the non-differential state (namely, locked state), that is, between the continuously-variable shifting state in which the continuously-variable transmission portion 11 (the power distributing mechanism 16) is operable as an electrically controlled continuously variable transmission the speed ratio of which is continuously variable, and the locked state in which the continuously-variable transmission portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

The step-variable transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2, ZS3/ZR3, and ZS4/ZR4, respectively.

In the step-variable transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neural position is selectively established by engaging actions of a corresponding combination of the two frictional coupling devices selected from the above-described first clutch C1, second clutch C2, first brake B1, second brake B2 and third brake B3, as indicated in the table of FIG. 2. The above-indicated positions have respective speed ratios γT (input shaft speed $N_{IN}$/output shaft speed $N_{OUT}$) which change as geometric series. In the present embodiment, the power distributing mechanism 16 is provided with the switching clutch C0 and the switching brake B0 one of which is engaged to place the continuously-variable transmission portion 11 in the continuously-variable shifting state in which the continuously-variable transmission portion 11 is operable as a continuously variable transmission, or in the step-variable shifting state (fixed-speed-ratio shifting state) in which the continuously-variable transmission portion 11 is operable as a step-variable transmission having a fixed speed ratio or ratios. In the present transmission mechanism 10, therefore, the continuously-variable transmission portion 11 placed in the fixed-speed-ratio shifting state by the engaging action of one of the switching clutch C0 and switching brake B0 cooperates with the step-variable transmission portion 20 to constitute a step-variable transmission device, while the continuously-variable transmission portion 11 placed in the continuously-variable shifting state with the switching clutch C0 and switching brake B0 being both held in the released state cooperates with the step-variable transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the continuously-variable transmission portion 11 is selectively placed in one of its step-variable and continuously-variable shifting states.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the continuously-variable transmission portion 11 functions as the continuously variable transmission, while the step-variable transmission portion 20 connected in series to the continuously-variable transmission portion 11 functions as the step-variable transmission, whereby the speed of the rotary motion transmitted to the step-variable transmission portion 20 placed in a selected one of the first, second, third and fourth gear positions, namely, the rotating speed of the power transmitting member 18 is continuously changed, so that the speed ratio of the drive system when the step-variable transmission portion 20 is placed in the selected gear position is continuously variable over a predetermined range. Accordingly, the overall speed ratio γT of the transmission mechanism 10 determined by the speed ratio γ0 of the continuously-variable transmission portion 11 and the speed ratio γ of the step-variable transmission portion 20 is continuously variable.

Figure 3:
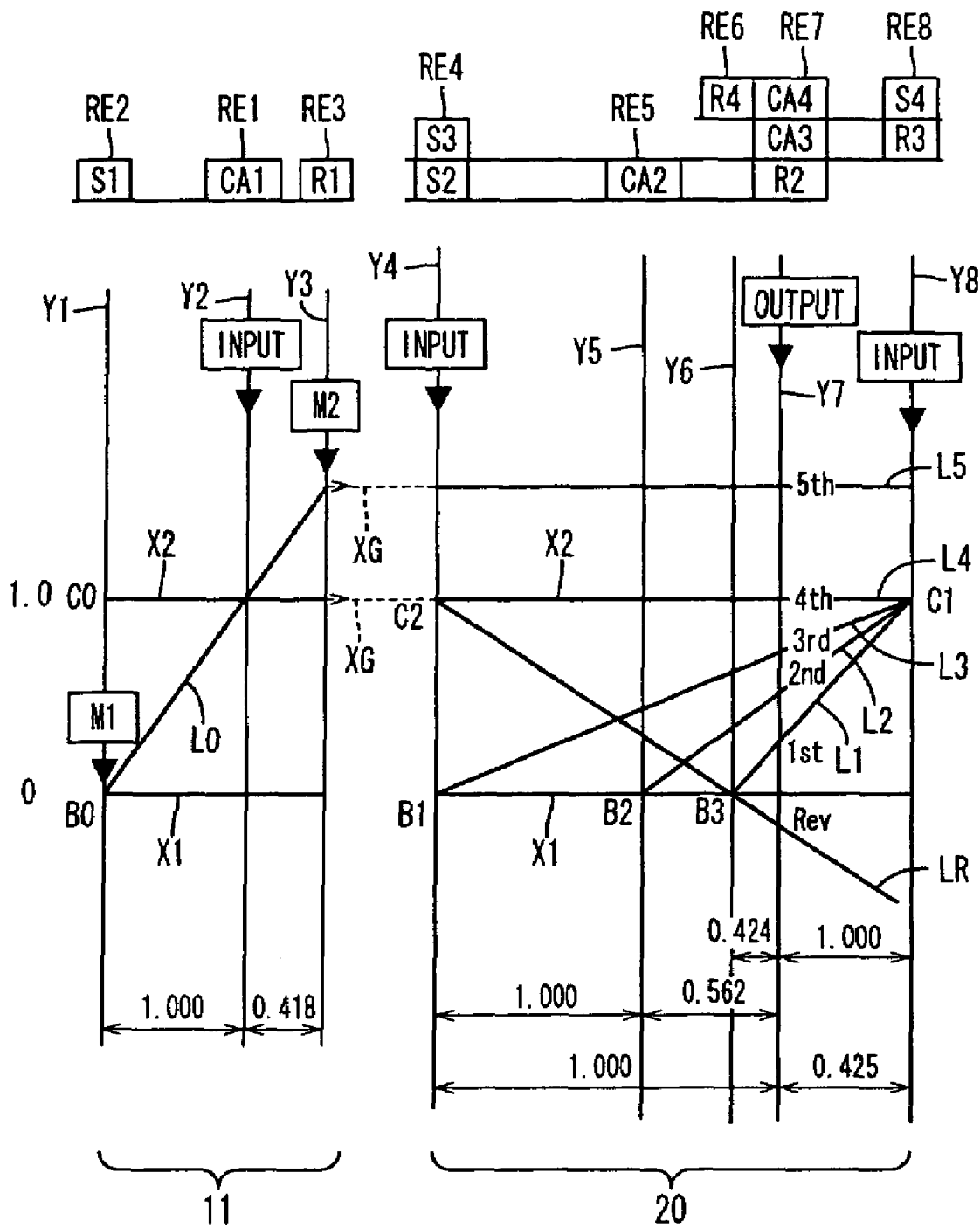
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the continuously-variable transmission portion 11 functioning as the continuously-variable shifting portion or first shifting portion, and the step-variable transmission portion 20 functioning as the step-variable shifting portion (step-variable transmission portion) or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the continuously-variable transmission portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the continuously-variable transmission portion 11, the distance between the vertical lines Y1 and Y2 corresponds to "1", while the distance between the vertical lines Y2 and Y3 corresponds to the gear ratio ρ. In the step-variable transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (continuously-variable transmission portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the step-variable transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2 is raised or lowered. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the straight line L0 is aligned with the horizontal line X2, and the power transmitting member 18 is rotated at a speed equal to the engine speed $N_E$. When the switching brake B0 is engaged, on the other hand, the rotary motion of the first sun gear S1 is stopped, and the power distributing mechanism 16 is placed in the non-differential state in which the power distributing mechanism 16 functions as a speed increasing mechanism, so that the straight line L0 is inclined in the state indicated in FIG. 3, whereby the rotating speed of the first ring gear R1 represented by a point of intersection between the straight lines L0 and Y3, that is, the rotating speed of the power transmitting member 18 is made higher than the engine speed $N_E$ and transmitted to the step-variable transmission portion 20.

In the step-variable transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the step-variable transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed $N_E$, with the drive force received from the continuously-variable transmission portion 11, that is, from the power distributing mechanism 16. When the switching clutch B0 is engaged in place of the switching clutch C0, the eighth rotary element RE8 is rotated at a speed higher than the engine speed $N_E$, with the drive force received from the power-distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
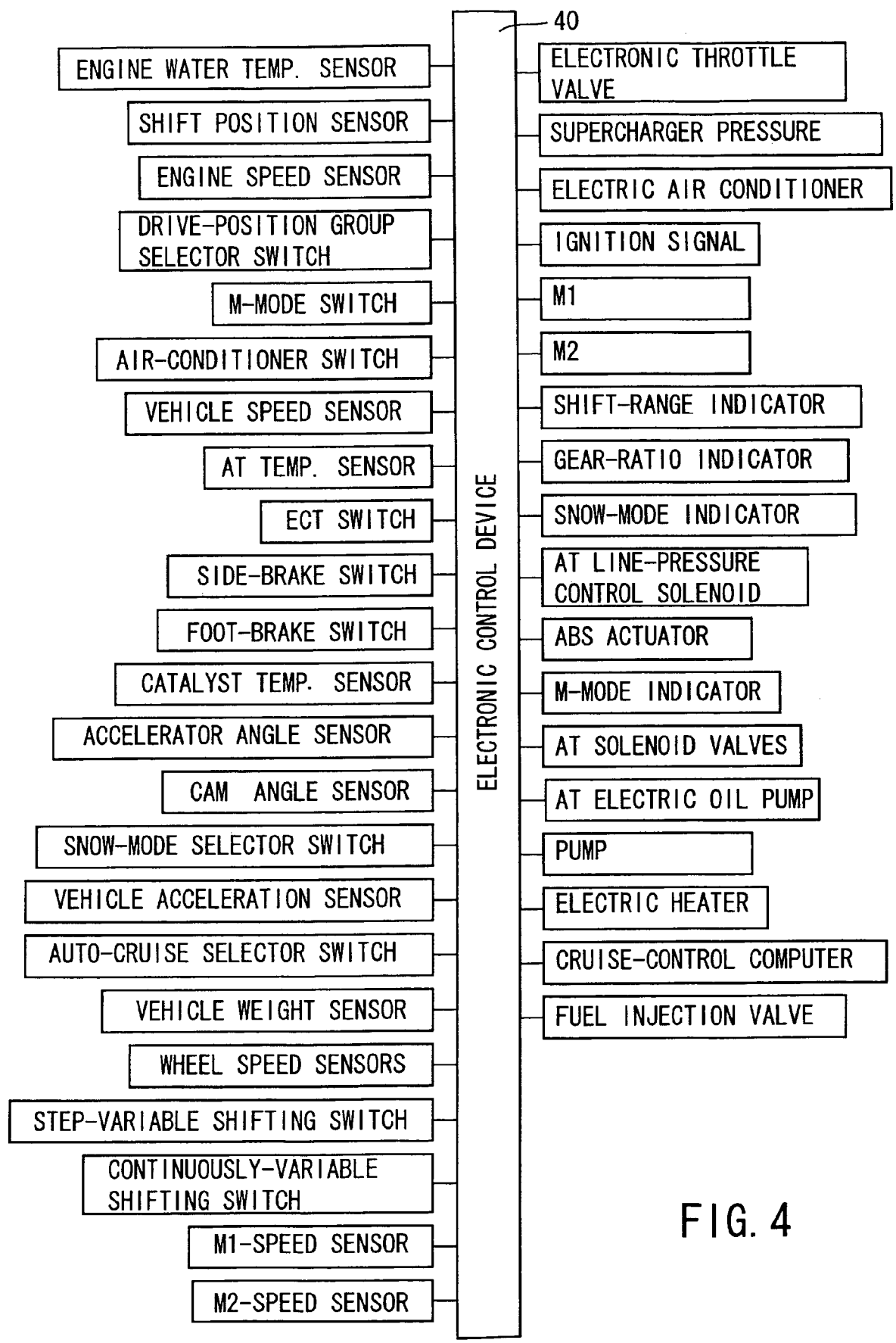
FIG. 4 is a view indicating input and output signals of an electronic control device according to one embodiment of this invention to control the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature $TEMP_W$ of cooling water of the engine 8; a signal indicative of a selected operating position $P_{SH}$ of a shift lever; a signal indicative of the operating speed $N_E$ of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed $N_{OUT}$ of the output shaft 22; a signal indicative of a temperature of a working oil of the step-variable transmission portion 20; a signal indicative of an operated state of a side brake; a signal indicative of an operated state of a foot brake; a signal indicative of a temperature of a catalyst; a signal indicative of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the continuously-variable transmission portion 11 (power distributing mechanism 16) in the fixed-speed-ratio shifting state in which the transmission mechanism 10 functions as a step-variable transmission; a signal indicative of a continuously-variable shifting switch provided to place the continuously-variable transmission portion 11 in the continuously variable-shifting state (differential state) in which the transmission mechanism 10 functions as the continuously variable transmission; a signal indicative of a rotating speed $N_{M1}$ of the first electric motor M1 (hereinafter referred to as "first electric motor speed $N_{M1}$"); and a signal indicative of a rotating speed $N_{M2}$ of the second electric motor M2 (hereinafter referred to as "second electric motor speed $N_{M2}$).

The electronic control device 40 is further arranged to generate various signals such as: a drive signal to drive a throttle actuator for controlling an angle of opening $\theta_{TH}$ of an electronic throttle valve 94; a fuel injection amount signal to control an amount of injection of a fuel by a fuel injecting device 96 into the engine 8; a supercharger pressure adjusting signal for adjusting a supercharger pressure of the engine 8; an air conditioner drive signal to operate the electric air conditioner; an ignition signal to be applied to an ignition device 98 to control the ignition timing of the engine 8; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; valve drive signals to operate solenoid-operated valves incorporated in a hydraulic control unit 42 (shown in FIG. 5) provided to control the hydraulic actuators of the hydraulically operated frictional coupling devices of the continuously-variable transmission portion 11 and step-variable transmission portion 20; a drive signal to operate an electric oil pump used as a hydraulic pressure source for the hydraulic control unit 42; a signal to drive an electric heater; and a signal to be applied to a cruise-control computer.

FIG. 5 is a functional block diagram of FIG. 5 for explaining major control functions of the electronic control device. A step-variable shifting control means 54 shown in FIG. 5 is arranged to determine whether a shifting action of the step-variable transmission portion 20 should take place, that is, to determine the gear position to which the step-variable transmission portion 20 should be shifted. This determination is made on the basis of a condition of the vehicle in the form of the vehicle speed V and an output torque $T_{OUT}$ of the step-variable transmission portion 20, and according to a shifting boundary line map (shifting control map or relation) which is stored in memory means 56 and which represents shift-up boundary lines indicated by solid lines in FIG. 5 and shift-down boundary lines indicated by one-dot chain lines in FIG. 5. The step-variable shifting control means 54 generates commands (shifting commands) to be applied to the hydraulic control unit 42, to selectively engage and release the respectively two hydraulically operated frictional coupling devices (except the switching clutch C0 and brake B0), for establishing the determined gear position of the step-variable transmission portion 20 according to the table of FIG. 2.

A hybrid control means 52 functions as continuously-variable shifting control means and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the continuously-variable transmission portion 11 operating as the electrically controlled continuously variable transmission, while the transmission mechanism 10 is placed in the continuously-variable shifting state, that is, while the continuously-variable transmission portion 11 is placed in the differential state. For instance, the hybrid control means 52 calculates a target (required) vehicle output at the present running speed V of the vehicle, on the basis of the operating amount $A_{CC}$ of the accelerator pedal 46 used as an operator's required vehicle output and the vehicle running speed V, and calculate a target total vehicle output on the basis of the calculated target vehicle output and a required amount of generation of an electric energy by the first electric motor M1. The hybrid control means 52 calculates a target output of the engine 8 to obtain the calculated target total vehicle output, while taking account of a power transmission loss, a load acting on various devices of the vehicle, an assisting torque generated by the second electric motor M2, etc. The hybrid control means 52 controls the speed $N_E$ and torque $T_E$ of the engine 8, so as to obtain the calculated target engine output, and the amount of generation of the electric energy by the first electric motor M1.

The hybrid control means 52 is arranged to implement the hybrid control while taking account of the presently selected gear position of the step-variable transmission portion 20, so as to improve the drivability of the vehicle and the fuel economy of the engine 8. In the hybrid control, the continuously-variable transmission portion 11 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the transmission portion 20. That is, the hybrid control means 52 determines a target value of the overall speed ratio γT of the transmission mechanism 10, so that the engine 8 is operated according to a stored highest-fuel-economy curve (fuel-economy map or relation) stored in memory means and indicated by broken line in FIG. 7. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 52 controls the speed ratio γ0 of the continuously-variable transmission portion 11, so as to obtain the target value of the overall speed ratio γT, so that the overall speed ratio γT can be controlled within a predetermined range, for example, between 13 and 0.5.

In the hybrid control, the hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

It is noted in particular that the step-variable transmission portion 20 is shifted under the control of the step-variable shifting control means 54, to change its speed ratio in steps, whereby the overall speed ratio γT of the transmission mechanism 10 is changed in steps. Namely, the overall speed ratio γT of the transmission mechanism 10 is changed during a shifting action of the step-variable transmission portion 30, in steps or non-continuously, rather than continuously as in a continuously variation transmission the speed ratio of which is continuously changed.

In view of the facts indicated above, the hybrid control means 52 is arranged to control the speed ratio of the continuously-variable transmission portion 11 in synchronization with a shifting action of the step-variable transmission portion 20, so as to reduce an amount of change of the change of the overall speed ratio γT in steps during the shifting action of the step-variable transmission portion 20, that is, to prevent a change of the engine speed $N_E$ upon a change of the input speed $N_{IN}$ of the step-variable transmission portion 20, for example, to prevent the amount of change of the engine speed $N_E$ beyond a predetermined threshold $N_E'$, irrespective of a change of the rotating speed of the power transmitting member 18 (of the second electric motor M2), which is the input speed of the step-variable transmission portion 20 during its shifting action. In other words, the hybrid control means 52 is arranged to control the speed ratio of the continuously-variable transmission portion 11 in synchronization with the shifting action of the step-variable transmission portion 20, so that the overall speed ratio γT continuously changes during the shifting action of the step-variable transmission portion 20. The above-indicated predetermined threshold $N_E'$ is a target value of the engine speed $N_E$ value used for controlling the speed ratio of the continuously-variable transmission portion 11 so as to cause a continuous change of the overall speed ratio γT during the shifting action of the step-variable transmission portion 20. This target value is obtained by experimentation and stored in memory.

For instance, the hybrid control means 52 is arranged to change the speed ratio γ0 of the continuously-variable transmission portion 11 in a direction opposite to the direction of change of the speed ratio γ of the step-variable transmission portion 20, by an amount equal to the amount of change of the speed ratio γ in steps, in synchronization with the shifting action of the step-variable transmission portion 20, so as to prevent a non-continuous transient change of the overall speed ratio γT during the shifting action of the step-variable transmission portion 20, that is, so as to hold the engine speed $N_E$ substantially constant before and after the shifting action of the step-variable transmission portion 20, for thereby permitting a continuous change of the overall speed ratio γT. This arrangement is effective to reduce the amount of stepping change of the engine speed $N_E$ during the shifting action of the step-variable transmission portion 20, for thereby reducing the shifting shock, in spite of the stepping change of the speed ratio γ of the step-variable transmission portion 20 due to the shifting action.

Figure 7:
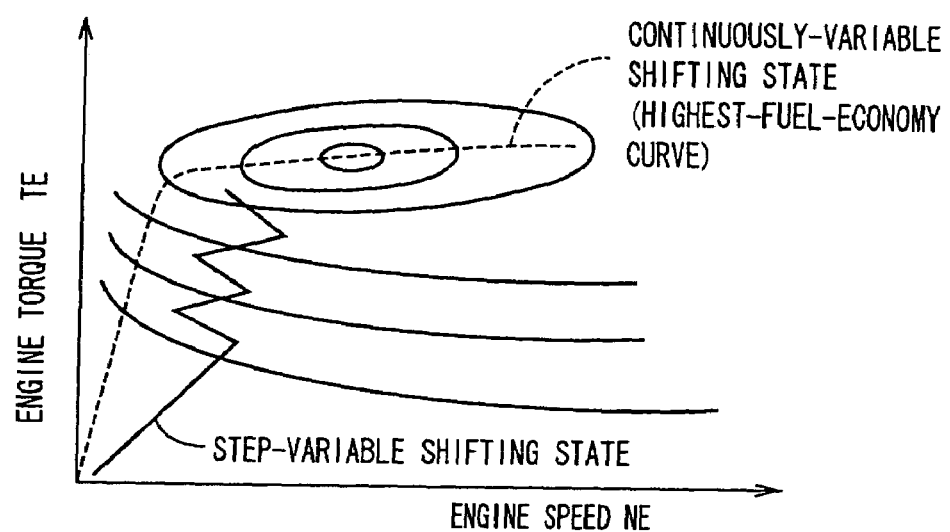
FIG. 7 is a view illustrating an example of a fuel consumption map defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

Described in another point of view, the engine 8 is generally operated with a step-variable transmission, following a one-dot chain line indicated in FIG. 7, and with a continuously variable transmission, following the highest-fuel-economy curve indicated by broken line in FIG. 7, or following a line closer to the highest-fuel-economy curve, than when the engine 8 is operated with the step-variable transmission. Accordingly, the engine torque $T_E$ for obtaining the required vehicle drive torque (drive force) is obtained at the engine speed $N_E$ which is closer to the highest-fuel-economy curve, when the engine 8 is operated with the continuously variable transmission than when it is operated with the step-variable transmission. This means that the continuously variable transmission permits a higher degree of fuel economy that the step-variable transmission. Therefore, the hybrid control means 52 is arranged to control the speed ratio γ of the continuously-variable transmission portion 11 such that the engine 8 is operated following the highest-fuel-economy line indicated by the broken line in FIG. 7, for preventing deterioration of the fuel economy, in spite of a change of the speed ratio of the step-variable transmission portion 20 in steps during its shifting action. This arrangement enables the transmission mechanism 10 as a whole to function as a continuously variable transmission, thereby assuring an improved fuel economy.

As described above, the hybrid control means 52 is arranged to implement a so-called "synchronous speed ratio control" of the continuously-variable transmission portion 11 in synchronization with the shifting action of the step-variable transmission portion 20. This synchronous speed ratio control is initiated at a moment which is determined by taking account of a response delay from a moment of determination by the step-variable control means 54 of a shifting action of the step-variable transmission portion 20 to a moment of initiation of an actual change of the input speed $N_{IN}$ of the step-variable transmission portion 20 caused by operations of the appropriate hydraulically operated frictional coupling devices, namely, a response delay up to a moment of initiation of a so-called "inertia phase" in which the input speed $N_{IN}$ of the step-variable transmission portion 20, that is, the rotating speed of the power transmitting member 18 changes in the process of the shifting action of the step-variable transmission portion 20. For example, the response delay is obtained by experimentation and stored in memory. Alternatively, the hybrid control means 52 initiates the synchronous speed ratio control of the continuously-variable transmission portion 11 at a moment of detection of initiation of an actual change of the input speed $N_{IN}$ of the step-variable transmission portion 20.

The synchronous speed ratio control of the continuously-variable transmission portion 11 is terminated at a moment of termination of the inertia phase in the process of the shifting action of the step-variable transmission portion 20. For example, a length of duration of the shifting action of the step-variable transmission portion 20 is obtained by experimentation and stored in memory. Alternatively, the hybrid control means 52 terminates the synchronous speed ratio control of the continuously-variable transmission portion 11 at a moment of detection that the actual change of the input speed $N_{IN}$ of the step-variable transmission portion 20 has been zeroed.

As described above, the hybrid control means 52 implements the synchronous speed ratio control of the continuously-variable transmission portion 11, during the time period of the inertia phase in the process of the shifting action of the step-variable transmission portion 20, for example, during a time period obtained by experimentation, or during a length of time from the moment of initiation of the actual change of the input speed $N_{IN}$ of the step-variable transmission portion 20 to the moment of detection of zeroing of the actual change of the input speed $N_{IN}$. In other words, the hybrid control means 52 controls the speed ratio of the continuously-variable transmission portion 11 in the inertia phase of the step-variable transmission portion 20, such that the control of the speed ratio of the continuously-variable transmission portion 11 is effected in synchronization with the shifting action of the step-variable transmission portion 20.

The hybrid control means 52 includes engine output control means functioning to control the engine 8, so as to provide a required output, by controlling the throttle actuator to open and close the electronic throttle valve 94, and controlling an amount and time of fuel injection by the fuel injecting device 96 into the engine 8, and/or the timing of ignition of the igniter by the ignition device 98, alone or in combination. For instance, the hybrid control means 52 is basically arranged to control the throttle actuator on the basis of the operating amount $A_{CC}$ of the accelerator pedal 45 and according to a predetermined stored relationship (not shown) between the operating amount $A_{CC}$ and the opening angle $\theta_{TH}$ of the electronic throttle valve such that the opening angle $\theta_{TH}$ increases with an increase of the operating amount $A_{CC}$.

Figure 6:
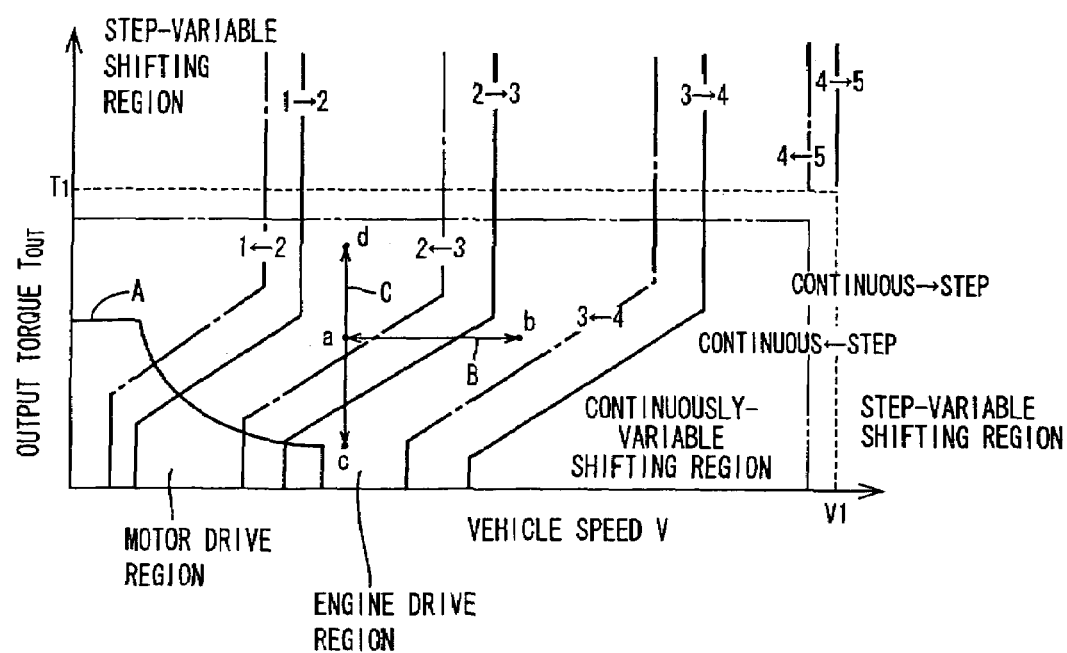
FIG. 6 is a view illustrating an example of a stored shifting boundary line map used for determining a shifting action of an step-variable transmission portion, an example of a stored switching boundary line map used for switching the shifting state of a transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control means 52 is capable of establishing a motor-drive mode to drive the vehicle by the electric motor, by utilizing the electric CVT function of the continuously-variable transmission portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque $T_{OUT}$. This drive-power-source switching map is stored in the memory means 56, together with the shifting boundary line map (shifting map) indicated by solid lines and one-dot chain lines in FIG. 6.

The hybrid control means 52 determines whether the vehicle condition is in the motor-drive region or engine-drive region, and establishes the motor-drive mode or engine-drive mode. This determination is made on the basis of the vehicle condition represented by the vehicle speed V and the required output torque $T_{OUT}$, and according to the drive-power-source switching map of FIG. 6. As is understood from FIG. 6, the motor-drive mode is generally established by the hybrid control means 52, when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque $T_{OUT}$ or engine torque $T_E$ due to an operation of the accelerator pedal, the vehicle may be started in the engine-drive mode.

For reducing a dragging of the engine 8 in its non-operated state and improving the fuel economy in the motor-drive mode, the hybrid control means 52 is arranged to hold the engine speed $N_E$ at zero or substantially zero as needed, owing to the electric CVT function (differential function) of the continuously-variable transmission portion 11, that is, by controlling the continuously-variable transmission portion 11 to perform its electric CVT function (differential function), so that the first electric motor speed 1 is controlled so as to be freely rotated to have a negative speed $N_{M1}$.

The hybrid control means 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode.

The hybrid control means 52 is arranged to hold the engine 8 in an operated state owing to the electric CVT function of the continuously-variable transmission portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed $N_E$ of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control means 52 is further arranged to control the first electric motor speed $N_{M1}$ and/or the second electric motor speed $N_{M2}$, by using the electric CVT function of the continuously-variable transmission portion 11, for thereby holding the engine speed $N_E$ constant or changing the engine speed $N_E$ to a desired value, irrespective of whether the vehicle is stationary or running. In other words, the hybrid control means 52 is capable of controlling the first electric motor speed $N_{M1}$ and/or the second electric motor speed $N_{M2}$, while holding the engine speed $N_E$ constant or changing the engine speed $N_E$ to the desired value. When the engine speed NE is raised during running of the vehicle, for example, the hybrid control means 52 raises the first electric motor speed $N_{M1}$, while holding substantially constant the second electric motor speed $N_{M2}$ which is influenced by the vehicle speed V (speed of the drive wheels 38).

The high-speed-gear determining means 62 is arranged to determine whether the gear position to which the transmission mechanism 10 should be shifted on the basis of the vehicle condition and according to the shifting boundary line map stored in the memory means 56 and indicated in FIG. 6 by way of example is a high-speed-gear position, for example, the fifth gear position. This determination is made by determining whether the gear position selected by the step-variable shifting control means 54 is the fifth gear position or not, to determine which one of the switching clutch C0 and brake B0 should be engaged to place the transmission mechanism 10 in the step-variable shifting state.

The switching control means 50 is arranged to selectively switch the transmission mechanism 10 between the continuously-variable shifting state and the step-variable shifting state, that is, between the differential state and the locked state, by engaging and releasing the coupling devices (switching clutch C0 and brake B0) on the basis of the vehicle condition. For example, the switching control means 50 is arranged to determine whether the shifting state of the transmission mechanism 10 (continuously-variable transmission portion 11) should be changed, on the basis of the vehicle condition represented by the vehicle speed V and the required output torque $T_{OUT}$ and according to the switching boundary line map (switching control map or relation) stored in the memory means 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state.

Described in detail, when the switching control means 50 determines that the vehicle condition is in the step-variable shifting region, the switching control means 50 disables the hybrid control means 52 to implement a hybrid control or continuously-variable shifting control, and enables the step-variable shifting control means 54 to implement a predetermined step-variable shifting control in which the transmission portion 20 is automatically shifted according to the shifting boundary line map stored in the memory means 56 and indicated in FIG. 6 by way of example. FIG. 2 indicates the combinations of the engaging actions of the hydraulically operated frictional coupling devices C0, C1, C2, B0, B1, B2 and B3, which are stored in the memory means 56 and which are selectively used for automatic shifting of the step-variable transmission portion 20. In the step-variable shifting state, the transmission mechanism 10 as a whole constituted by the continuously-variable transmission portion 11 and the step-variable transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the switching control means 50 commands the hydraulic control unit 42 to release the switching clutch C0 and engage the switching brake B0, for enabling the continuously-variable transmission portion 11 to function as an auxiliary transmission having a fixed speed ratio γ0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the switching control means 50 commands the hydraulic control unit 42 to engage the switching clutch C0 and release the switching brake B0, for enabling the continuously-variable transmission portion 11 to function as an auxiliary transmission having a fixed speed ratio γ0 of 1.0, for example, so that the transmission mechanism 10 as a whole is placed in a speed-reducing gear position having a speed ratio not lower than 1.0. Thus, when the transmission mechanism 10 is switched to the step-variable shifting state by the switching control means 50, the continuously-variable transmission portion 11 operable as the auxiliary transmission is placed in a selected one of two gear positions under the control of the switching control means 50 while the step-variable transmission portion 20 connected in series to the continuously-variable transmission portion 11 functions as a step-variable transmission, so that the transmission mechanism 10 as a whole functions as the so-called step-variable automatic transmission.

When the switching control means 50 has determined that the vehicle condition is in the continuously-variable shifting region for placing the transmission mechanism 10 in the continuously-variable shifting state, the switching control means 50 commands the hydraulic control unit 42 to release both of the switching clutch C0 and brake B0, for placing the continuously-variable transmission portion 11 in the continuously-variable shifting state. At the same time, the switching control means 50 enables the hybrid control means 52 to implement the hybrid control, and commands the step-variable shifting control means 54 to select and hold a predetermined one of the gear positions, or to permit the step-variable transmission portion 20 to be automatically shifted according to the shifting boundary line map stored in the map memory 56 and indicated in FIG. 6 by way of example. In the latter case, the variable-step shifting control means 54 implements the automatic shifting control by suitably selecting the combinations of the operating states of the frictional coupling devices indicated in the table of FIG. 2, except the combinations including the engagement of the switching clutch C0 and brake B0. Thus, the continuously-variable transmission portion 11 switched to the continuously-variable shifting state under the control of the switching control means 50 functions as the continuously variable transmission while the step-variable transmission portion 20 connected in series to the continuously-variable transmission portion 11 functions as the step-variable transmission, so that the transmission mechanism 10 provides a sufficient vehicle drive force, such that the input speed $N_{IN}$ of the step-variable transmission portion 20 placed in one of the first through fourth gear positions, namely, the rotating speed $N_{18}$ of the power transmitting member 18 is continuously changed, so that the speed ratio of the transmission mechanism 10 when the transmission portion 20 is placed in one of those gear positions is continuously variable over a predetermined range. Accordingly, the speed ratio of the step-variable transmission portion 20 is continuously variable across the adjacent gear positions, whereby the total speed ratio γT of the transmission mechanism 10 is continuously variable.

The maps of FIG. 6 will be described in detail. The shifting boundary line map (shifting control map or relation) shown in FIG. 6 by way of example and stored in the memory means 56 is used for determining whether the step-variable transmission portion 20 should be shifted, and is defined in a two-dimensional coordinate system by control parameters consisting of the vehicle speed V and the drive-force-related value in the form of the required output torque $T_{OUT}$. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the switching control means 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque $T_{OUT}$ of the step-variable transmission portion 20 above which it is determined that the hybrid vehicle is in a high-output running state. The output torque $T_{OUT}$ is an example of the drive-force-related value which relates to the drive force of the hybrid vehicle. FIG. 6 also shows two-dot chain lines which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the switching control means 50 to determine whether the vehicle condition is in the step-variable shifting region or the continuously-variable shifting region, depending upon whether the control parameters in the form of the vehicle speed V and the output torque $T_{OUT}$ are higher than the predetermined upper limit values V, T1. This switching boundary line map may be stored in the memory means 56, together with the shifting boundary line map. The switching boundary line map may use at least one of the upper vehicle-speed limit V1 and the upper output-torque limit T1, or at least one of the vehicle speed V and the output torque $T_{OUT}$, as at least one parameter.

The above-described shifting boundary line map, switching boundary line, and drive-power-source switching map may be replaced by stored equations for comparison of the actual vehicle speed V with the limit value V1 and comparison of the actual output torque $T_{OUT}$ with the limit value T1. In this case, the switching control means 50 switches the transmission mechanism 10 in the step-variable shifting state by engaging the switching brake B0, when the actual vehicle speed V has exceeded the upper limit V1, or by engaging the switching clutch C0, when the output torque $T_{OUT}$ of the step-variable transmission portion 20 has exceeded the upper limit T1.

The switching control means 50 may be arranged to place the transmission mechanism 10 in the step-variable shifting state even when the vehicle condition is in the continuously-variable shifting region, upon detection of any functional failure or deterioration of the electric components such as the electric motors which are operable to operate the continuously-variable transmission portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque $T_{OUT}$ of the step-variable transmission portion 20, the engine output torque $T_E$ or an acceleration value G of the vehicle, as well as a drive torque or drive force of drive wheels 38. The parameter may be: an actual value calculated on the basis of the operating amount $A_{CC}$ of the accelerator pedal 45 or the opening angle of the throttle valve (or intake air quantity, air/fuel ratio or amount of fuel injection) and the engine speed $N_E$; or any one of estimated values of the required (target) engine torque $T_E$, required (target) output torque $T_{OUT}$ of the transmission potion 20 and required vehicle drive force, which are calculated on the basis of the operating amount $A_{CC}$ of the accelerator pedal 45 or the operating angle of the throttle valve. The above-described vehicle drive torque may be calculated on the basis of not only the output torque $T_{OUT}$, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
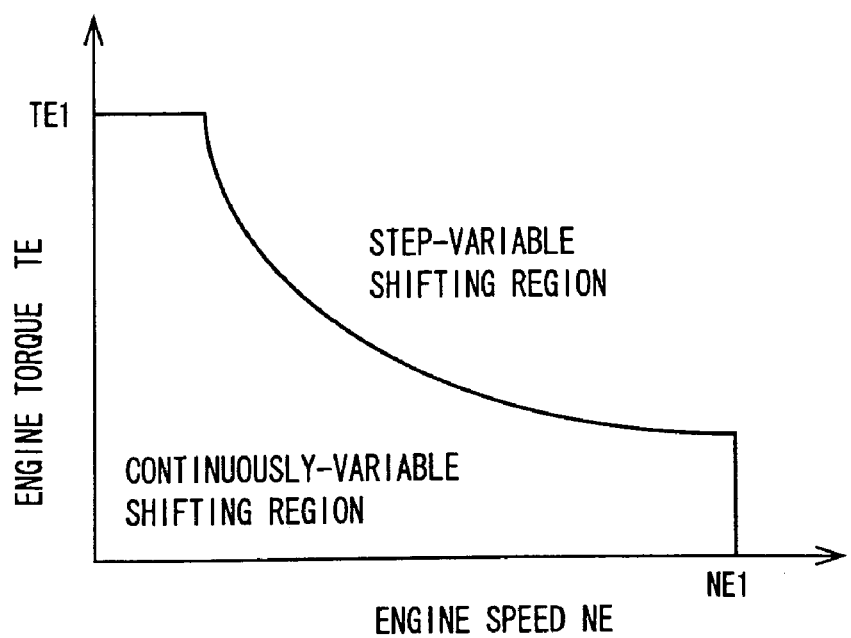
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 8, there is shown a switching boundary line map (switching control map or relation) which is stored in the memory means 56 and which defines engine-output lines serving as boundary lines used by the switching control means 50 to determine whether the vehicle condition is in the step-variable or continuously-variable shifting region. These engine-output lines are defined by control parameters in the form of the engine speed $N_E$ and the engine torque $N_T$. The switching control means 50 may use the switching boundary line map of FIG. 8 in place of the switching boundary line map of FIG. 6, to determine whether the vehicle condition is in the continuously-variable or step-variable shifting region, on the basis of the engine speed $N_E$ and engine torque $T_E$. The switching boundary line map of FIG. 6 may be based on the switching boundary line map of FIG. 8. In other words, the broken lines in FIG. 6 may be determined on the basis of the relation (map) of FIG. 8, in the two-dimensional coordinate system defined by the control parameters in the for of the vehicle speed V and the output torque $T_{OUT}$.

The step-variable shifting region defined by the switching boundary line map of FIG. 6 is defined as a high-torque drive region in which the output torque $T_{OUT}$ is not lower than the predetermined upper limit T1 or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque $T_E$ is not lower than the predetermined upper limit TE1, or a high-speed drive region in which the engine speed $N_E$ is not lower than the predetermined upper limit NE1, or alternatively defined as a high-output drive region in which the output of the engine 8 calculated on the basis of the engine torque $N_T$ and speed $N_E$ is not lower than a predetermined limit. Accordingly, the step-variable shifting control is implemented when the torque $T_E$, speed $N_E$ or output of the engine 8 is comparatively high, while the continuously-variable shifting control is implemented when the torque $T_E$, speed $N_E$ or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the continuously-variable transmission portion 11 functions as the electrically controlled continuously variable transmission.

In a high-output running state of the vehicle with the output torque $T_{OUT}$ higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can withstand the reaction torque when the engine output $T_E$ is not higher than the upper limit TE1, and the continuously-variable transmission portion 11 is placed in the step-variable shifting state when the vehicle is in the high-output running state in which the engine torque $T_E$ is higher than the upper limit TE1. In the step-variable shifting state of the transmission portion 11, therefore, the first electric motor M1 need not withstand the reaction torque with respect to the engine torque $T_E$ as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output $T_E$. That is, the required maximum output of the first electric motor M1 can be determined such that its reaction torque capacity is smaller than a value corresponding to the engine torque $T_E$ exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque $T_E$ is determined by experimentation such that the upper limit is a value which is equal to or lower than the maximum value of the engine torque $T_E$, and below which the first electric motor M1 can withstand the reaction torque, so that the deterioration of durability of the first electric motor M1 can be reduced.

Figure 9:
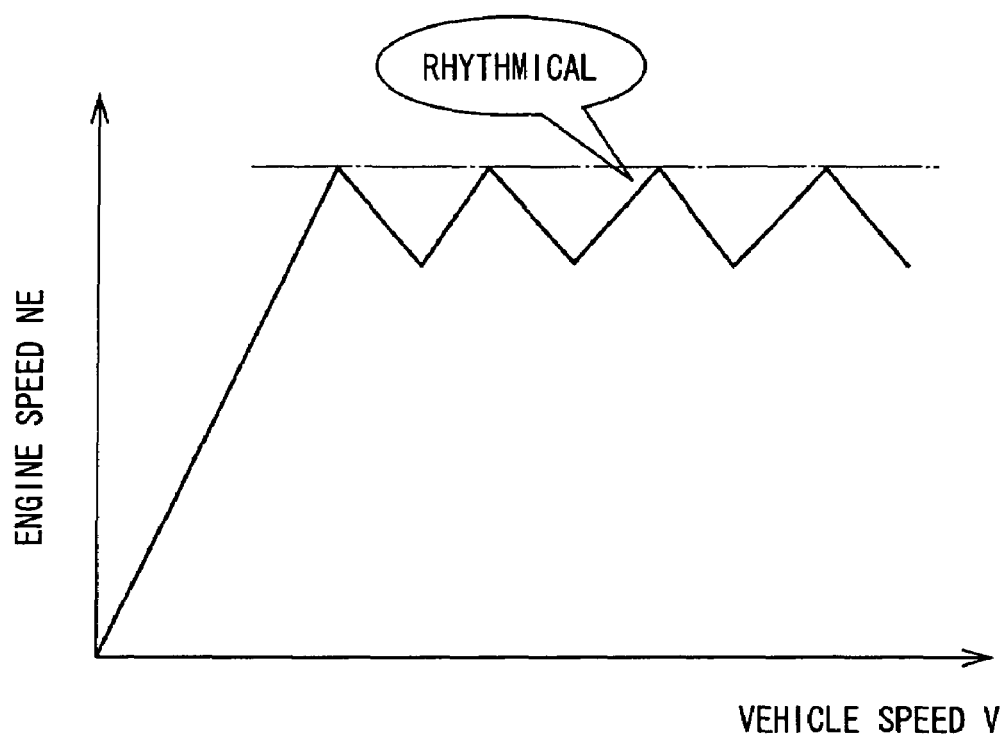
FIG. 9 is a view indicating an example of a change of the engine speed as a result of a shift-up action of the step-variable transmission.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed $N_E$ changes with a shift-up action of the step-variable transmission portion 20, assuring a comfortable rhythmic change of the engine speed $N_E$ as the transmission portion 20 is shifted up, as indicated in FIG. 9.

Figure 10:
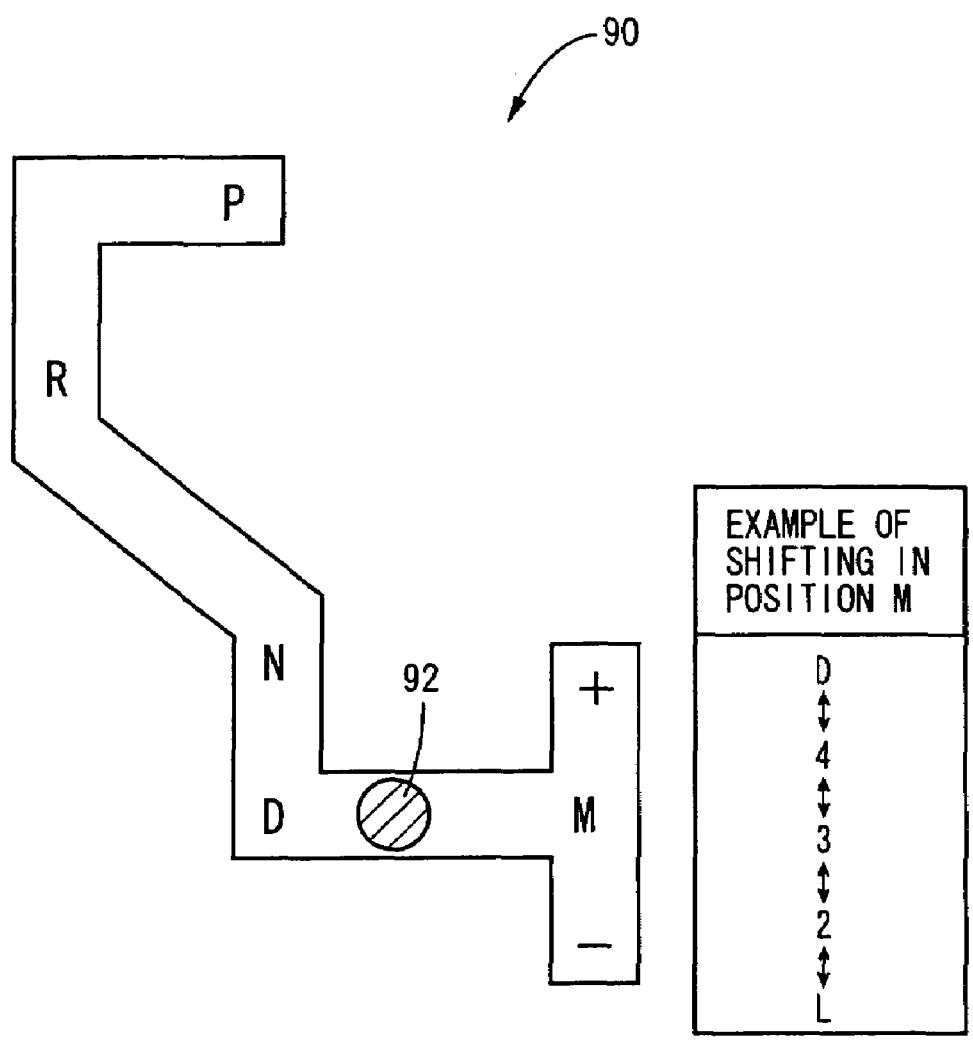
FIG. 10 is a view showing an example of a manually operated shifting device including a shift lever and operable to select one of a plurality of shift positions.

FIG. 10 shows an example of a manually operable shifting device in the form of a shifting device 90. The shifting device 90 includes the shift lever 92, which is disposed laterally adjacent to an operator's seat, for example, and which is manually operated to select one of a plurality of positions consisting of a parking position P for placing the drive system 10 (namely, step-variable transmission portion 20) in a neutral state in which a power transmitting path is disconnected with both of the switching clutch C0 and brake B0 placed in the released state, and at the same time the output shaft 22 of the step-variable transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 92 is operated to a selected one of the shift positions, a manual valve incorporated in the hydraulic control unit 42 and operatively connected to the shift lever 92 is operated to establish the corresponding state of the hydraulic control unit 42. In the automatic forward-drive position D or the manual forward-drive position M, one of the first through fifth gear positions ($1^{st}$ through $5^{th}$) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the step-variable transmission portion 20 is in the power-cut-off state established by releasing both of the clutches C1 and C2, as shown in the table of FIG. 2. In the drive positions R, D, M, the power transmitting path in the step-variable transmission portion 20 is in the power-transmitting state established by engaging at least one of the clutches C1 and C2, as also shown in the table of FIG. 2.

Described in detail, a manual operation of the shift lever 92 from the parking position P or neutral position N to the reverse-drive position R causes the second clutch C2 to be engaged for switching the power transmitting path in the step-variable transmission portion 20 from the power-cut-off state to the power-transmitting state. A manual operation of the shift lever 92 from the neutral position N to the automatic forward-drive position D causes at least the first clutch C1 to be engaged for switching the power transmitting path in the step-variable transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 92 is operated to the manual forward-drive position M, for manually selecting one of the above-indicated positions "D" through "L". Described in detail, the shift lever 92 is movable from the manual forward-drive position M to a shift-up position "+" and a shift-down position "−", which are spaced from each other in the longitudinal direction of the vehicle. Each time the shift lever 92 is moved to the shift-up position "+" or the shift-down position "−", the presently selected position is changed by one position. The five positions "D" through "L" have respective different lower limits of a range in which the overall speed ratio γT of the transmission mechanism 10 is automatically variable, that is, respective different lowest values of the overall speed ratio γT which corresponds to the highest output speed of the transmission mechanism 10. Namely, the five positions "D" through "L" select respective different numbers of the speed positions (gear positions) of the step-variable transmission portion 20 which are automatically selectable, so that the lowest overall speed ratio γT available is determined by the selected number of the gear positions. The shift lever 92 is biased by biasing means such as a spring so that the shift lever 92 is automatically returned from the shift-up position "+" and shift-down position "−" back to the manual forward-drive position M. The shifting device 46 is provided with a shift-position sensor (not shown) operable to detect the presently selected position of the shift lever 92, so that signals indicative of the presently selected operating position of the shift lever 48 and the number of shifting operations of the shift lever 92 in the manual forward-shifting position M.

When the shift lever 92 is operated to the automatic forward-drive position D, the switching control means 50 effects an automatic switching control of the transmission mechanism 10 according to the stored switching boundary line map indicated in FIG. 6, and the hybrid control means 52 effects the continuously-variable shifting control of the power distributing mechanism 16, while the step-variable shifting control means 54 effects an automatic shifting control of the step-variable transmission portion 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the step-variable transmission portion 20 is automatically controlled to select an appropriate one of the first through fourth gear positions, so that the overall speed ratio γT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 92 is operated to the manual forward-drive position M, on the other hand, the shifting action of the transmission mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio γT. When the transmission mechanism 10 is placed in the step-variable shifting state, the speed ratio of the power distributing mechanism 16 is continuously changed, while the shifting action of the step-variable transmission portion 20 is automatically controlled to select an appropriate one of the gear positions the number of which is determined by the manually selected one of the shift positions, so that the overall speed ratio γT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

In the present embodiment, the hybrid control means 52 controls the speed ratio of the continuously-variable transmission portion 11 for continuously changing the overall speed ratio γT during a shifting action of the step-variable transmission portion 20 under the control of the step-variable shifting control means 54, for reducing the shifting sock and improving the fuel economy. Where the target value of the overall speed ratio γT changes by a large amount during the shifting action of the step-variable transmission portion 20, the speed ratio of the continuously-variable transmission portion 11 is once controlled so that the overall speed ratio γT continuously changes during the shifting action, and is then controlled so that the overall speed ratio γT changes toward the target value. Unlike a change of the overall speed ratio γT in steps, this continuous change of the overall speed ratio γT may deteriorate the shifting response. Namely, an amount of change of the target value of the overall speed ratio γT determined to obtain a target vehicle output (target total vehicle output or required vehicle drive force), with respect to the present value of the overall speed ratio γT is not constant, so that there is a risk of deterioration of the shifting response depending upon the amount of change of the target value.

Where the step-variable transmission portion 20 is shifted as indicated by arrow "a" or "b" of solid line B in FIG. 6, as a result of a change of the vehicle speed V, the amount of change of the overall speed ratio γT during the shifting action of the step-variable transmission portion 20 is small of almost zero, so that the continuous change of the overall speed ratio γT during the shifting action of the step-variable transmission portion 20 has a low risk of deterioration of the shifting response. Where the step-variable transmission portion 20 is shifted as indicated by arrow "c" and "d" of solid line C in FIG. 6, as a result of a change of the required output torque $T_{OUT}$ due to a depressing or releasing operation of the accelerator pedal, on the other hand, the amount of change of the overall speed ratio γT during the shifting action of the step-variable transmission portion 20 is larger than in the case of the solid line B, so that the continuous change of the overall speed ratio γT during the shifting action of the step-variable transmission portion 20 has a risk of deterioration of the shifting response.

Therefore, where the amount of change of the overall speed ratio γT during the shifting action of the step-variable transmission portion 20 is small or almost zero, the overall speed ratio γT is desirably changed continuously to reduce the shifting shock and improve the fuel economy rather than to improve the shifting shock. Where the amount of change of the overall speed ratio γT during the shifting action of the step-variable transmission portion 20 is large, on the other hand, the overall speed ratio γT is desirably changed non-continuously or in steps to improve the shifting response. Stated differently, where the amount of change of the overall speed ratio γT is large during the shifting action of the step-variable transmission 20 caused by a depressing or releasing operation of the accelerator pedal, the vehicle user feels comfortable with a change of the overall speed ratio γT in steps, that is, a stepping change of the overall speed ratio γT. In this case, therefore, it is desired to change the overall speed ratio γT by utilizing the stepping change of the speed ratio γ of the step-variable transmission portion 20.

Described in detail referring back to FIG. 5, the hybrid control means 52 has not only the above-described function of controlling the speed ratio γ0 of the continuously-variable transmission portion 11 in synchronization with the shifting action of the step-variable transmission portion 20 under the control of the step-variable shifting control means 54, for thereby continuously changing the overall speed ratio γT, but also an additional function of controlling the speed ratio of the continuously-variable transmission portion 11 alone to change the overall speed ratio γT toward the target value, independently of the shifting action of the step-variable transmission portion 20. This additional function is provided to change the overall speed ratio γT toward the target value, by adding (or subtracting) the amount of change of the speed ratio of the continuously-variable transmission portion 11 to (from) the amount of stepping change of the speed ratio of the step-variable transmission portion 20, so that the overall speed ratio γT is changed in steps during the shifting action of the step-variable transmission 20, whereby the shifting response is improved.

The present embodiment is provided with first shifting control means (for practicing a first shifting control method) for controlling the speed ratio of the continuously-variable transmission portion 11 upon a shifting action of the step-variable transmission portion 20, for example, during the shifting action, so as to prevent the amount of change of the engine speed $N_E$ beyond the predetermined threshold $N_E'$, and second shifting control means (for practicing a second shifting control method) for controlling the speed ratio of the continuously-variable transmission portion 11 independently of the shifting action of the step-variable transmission portion 20.

Namely, the hybrid control means 52 has the above-described first shifting control means and second shifting control means, and is arranged to selectively activate the first and second shifting control means, on the basis of a manner in which the overall speed ratio γT of the transmission mechanism 10 is changed upon the shifting action of the step-variable transmission portion 20, for example, on the basis of the amount of change of the overall speed ratio γT. That is, the hybrid control means 52 selectively activates the first shifting control means and the second shifting control means, upon the shifting action of the step-variable transmission portion 20, for example, during the shifting action of the step-variable transmission portion 20, depending upon whether it is desirable to change the overall speed ratio γT during the shifting action, either continuously or non-continuously.

For instance, the hybrid control means activates the first shifting control means to control the speed ratio of the continuously-variable transmission portion 11 where the overall speed ratio γT should be continuously changed during the shifting action indicated by the arrow "a" or "b" of the solid line B in FIG. 6, and activates the second shifting control means to control the speed ratio of the continuously-variable transmission portion 11 where the overall speed ratio γT should be non-continuously changed during the shifting action indicated by the arrow "c" or "d" of the solid line C.

In other words, the hybrid control means 52 is arranged to selectively implement, upon a shifting action of the step-variable transmission portion 20, a control of the speed ratio of the continuously-variable transmission portion 11 under the first shifting control means for continuously changing the overall speed ratio γT, or a control of the speed ratio of the continuously-variable transmission portion 11 under the second shifting control means for non-continuously changing the overall speed ratio γT.

Differential-state determining means 80 is operable upon determination of a shifting action of the step-variable transmission portion 20 by the step-variable shifting control means 54, for example, upon determination of the gear position to which the step-variable transmission portion 20 should be shifted according to the shifting map shown in FIG. 6 and on the basis of the vehicle condition. The differential-state determining means 80 is arranged to determine whether the power distributing mechanism 16, that is, the continuously-variable transmission portion 11 is placed in the differential state, that is, in the continuously-variable shifting state. For instance, the differential-state determining means 80 determines whether the continuously-variable transmission portion 11 is placed in the continuously-variable shifting state, by determining whether the vehicle condition represented by the vehicle speed V and the output torque $T_{OUT}$ is in the continuously-variable shifting region. The determination as to whether the vehicle condition is in the continuously-variable shifting region is made according to the switching shown in FIG. 6 by way of example, which is formulated to define the step-variable shifting region in which the transmission mechanism 10 should be switched to the step-variable shifting state, and the continuously-variable shifting region in which the transmission mechanism 10 should be shifted to the continuously-variable shifting state.

The control of the speed ratio of the continuously variable transmission portion 11 under the control of the first shifting control means or second shifting control means of the hybrid control means 52 should be implemented while the continuously-variable transmission portion 11 is placed in its differential state. Accordingly, upon determination of a shifting action of the step-variable transmission portion 20, the differential-state determining means 80 determines whether the continuously-variable transmission portion 11 is placed in the differential state, for the purpose of determining whether the speed ratio of the continuously-variable transmission portion 11 can be controlled.

Speed-ratio-change determining means 82 is operable upon determination of a shifting action of the step-variable transmission portion 20 by the step-variable shifting control means 54, for example, upon determination of the gear position to which the step-variable transmission portion 20 should be shifted according to the shifting map shown in FIG. 6 and on the basis of the vehicle condition. The speed-ratio-change determining means 82 is arranged to determine a change of the overall speed ratio γT.

For example, the speed-ratio-change determining means 82 determines whether the shifting action of the step-variable transmission portion 20 causes a non-continuous change of the overall speed ratio γT, that is, a stepping change of the overall speed ratio γT, due to an amount of change of the target value of the overall speed ratio γT which is larger than a predetermined threshold, as in the case of the shifting action which takes place as a result of a large amount of depressing operation or a releasing operation of the accelerator pedal as indicated by the arrow "c" or "d" of the solid line C in FIG. 6. The predetermined threshold of the target value of the overall speed ratio γT is a value which is obtained by experimentation and above which the change of the target value of the overall speed ratio γT is not considered continuous, namely, considered to be a stepping (that is, non-continuous) change.

When the speed-ratio-change determining means 82 determines that the change of the target value of the overall speed ratio γT is not a stepping change, the hybrid control means 52 activates the above-described first shifting control means to control the speed ratio of the continuously-variable transmission portion 11. When the speed-ratio-change determining means 82 determines that the change of the target value is a stepping change, the hybrid control means activates the above-described second shifting control means to control the speed ratio of the continuously-variable transmission portion 11.

Inertia-phase-entry determining means 84 is arranged to determine whether the step-variable transmission portion 20 has entered an inertia phase in the processing of its shifting action. This determination is made by determining whether a change of the rotating speed of the power transmitting member 18 (second electric motor M2) is initiated with initiation of transmission of a torque through a frictional coupling device to be engaged after a releasing action of a frictional coupling device for effecting the shifting action of the step-variable transmission portion 20 under the control of the step-variable shifting control means 54.

For example, the inertial-phase-entry determining means 84 determines whether a change of the second electric motor speed $N_{M2}$ is initiated with initiation of transmission of a torque through the frictional coupling device in its engaging action in the process of the shifting action of the step-variable transmission portion under the control of the step-variable shifting control means 54. This determination is made by determining whether the amount of change of the actual rotating speed of the power transmitting member 18, that is, the second electric motor speed $N_{M2}$ has reached a predetermined value which is obtained by experimentation to make the determination as to whether the inertia phase of the shifting action is initiated. Alternatively, the determination is made by determining whether a predetermined time has passed after the moment of the determination of the shifting action by the step-variable shifting control means 54. This predetermined time is obtained by experimentation, as a length of time from the moment of the determination of the shifting action to the moment at which the frictional coupling device in the process of its engaging action begins to transmit a torque. Further alternatively, the determination is made by determining whether the transient hydraulic pressure (command value) applied to the frictional coupling device in its engaging action has reached a predetermined value $P_C$, which is obtained by experimentation, as the hydraulic pressure at which the frictional coupling device in its engaging action begins to transmit the torque.

Torque-reduction control means 86 is arranged to reduce the vehicle drive torque to be transmitted to the drive wheels 38. For instance, the torque-reduction control means 86 is arranged to implement an engine torque reduction control to reduce the engine torque $T_E$, for thereby reducing the input torque $T_{IN}$ of the step-variable transmission portion 20 to reduce the torque to be transmitted to the drive wheels 38. The engine torque reduction control is implemented by reducing the angle of opening of the electronic throttle valve 94 or the amount of fuel injection by the fuel injecting device 96, or retarding the timing of ignition of the engine 8 by the ignition device 98. The torque-reduction control means 86 may be arranged to implement an electric-motor torque reduction control in addition to or in place of the engine torque reduction control for reducing the input torque $T_{IN}$. The electric-motor torque reduction control is implemented by controlling the inverter 58 to control the second electric motor M2, so as to temporarily generate a reverse vehicle drive torque, or generate a regenerative braking torque while charging the electric-energy storage device 60.

Where a shift-up action of the step-variable transmission portion 20 takes place under the control of the step-variable shifting control means 54, for example, while the transmission mechanism 10 is placed in the step-variable shifting state by the switching control means 50 and the transmission mechanism 10 as a whole is functioning as a step-variable automatic transmission, the input speed of the step-variable transmission portion 20, that is, the rotating speed of the power transmitting member 18 changes in the inertia phase of the shift-up action. In this inertial phase, there is a risk of generation of a shifting shock due to a so-called "inertia torque", which is caused by an increase of the input torque $T_{IN}$ or output torque $T_{OUT}$ due to an energy temporarily produced by the engine 8 while its speed $N_E$ is lowered.

Where a shifting action of the step-variable transmission portion 20 takes place under the control of the step-variable shifting control means 54 and the speed ratio of the continuously-variable transmission portion 11 is controlled by the first shifting control means of the hybrid control means 52 while the transmission mechanism 10 is placed in the continuously-variable shifting state by the switching control means 50 and the transmission mechanism 10 as a whole is functioning as a continuously variable transmission, the amount of change of the engine speed $N_E$ in the process of the shifting action of the continuously-variable transmission portion 11 is zero or restricted. In this case, too, there is a risk of generation of a shifting shock in the inertia phase of the shifting action of the step-variable transmission portion 20 in which the rotating speed of the power transmitting member 18 changes. That is, the shifting shock may take place due to an inertia torque which is caused by an increase of the output torque $T_{OUT}$ as a result of a decrease of the rotating speed of at least one of the fourth rotary element RE4 through the eighth rotary element RE8 of the step-variable transmission portion 20.

There is also a risk of generation of a shifting shock due to an inertia torque in the inertia phase of the shifting action of the step-variable transmission portion 20, which is caused by an increase of the output torque TOUT as a result of a decrease of the second rotary element RE2 or third rotary element RE3 of the continuously-variable transmission portion 11.

In view of the facts described above, the torque-reduction control means 86 reduces the input torque $T_{IN}$ of the step-variable transmission portion 20 upon a shifting action of the step-variable transmission portion 20 under the control of the step-variable shifting control means 54. Described in detail, the torque-reduction control means 86 reduces the input torque $T_{IN}$ of the step-variable transmission portion 20 by an amount corresponding to the inertia torque, by implementing the above-described engine torque reduction control or the electric-motor torque reduction control, or both of these two torque reduction controls, so that the shifting shock is reduced by offsetting the inertial torque with the reduction of the input torque $T_{IN}$. The reduction of the input torque TIN in the torque-reduction control means 86 is initiated in the inertial phase of the shifting action of the step-variable transmission portion 20, like the above-described synchronous speed ratio control of the continuously-variable transmission portion 11 by the hybrid control means 52.

The torque-reduction control means 86 is further arranged to reduce the input torque $T_{IN}$ of the step-variable transmission portion 20, for the purpose of offsetting a torque variation at the end of the engaging action of the frictional coupling device to be engaged to effect the shifting action of the step-variable transmission portion 20 under the control of the step-variable shifting control means 54, so that an engaging shock of the frictional coupling device is reduced.

As described above, the shifting shock is reduced by the torque-reduction control means 86 arranged to reduce the input torque $T_{IN}$ so as to offset the inertia torque due to a change of the rotating speed of the rotary elements of the step-variable transmission portion 20 during its shifting action, and the inertia torque due to a change of the rotating speed of the rotary elements of the continuously-variable transmission portion 11, and/or so as to offset the torque variation at the end of the engaging action of the frictional coupling device engaged to effect the shifting action of the step-variable transmission portion 20.

Figure 11:
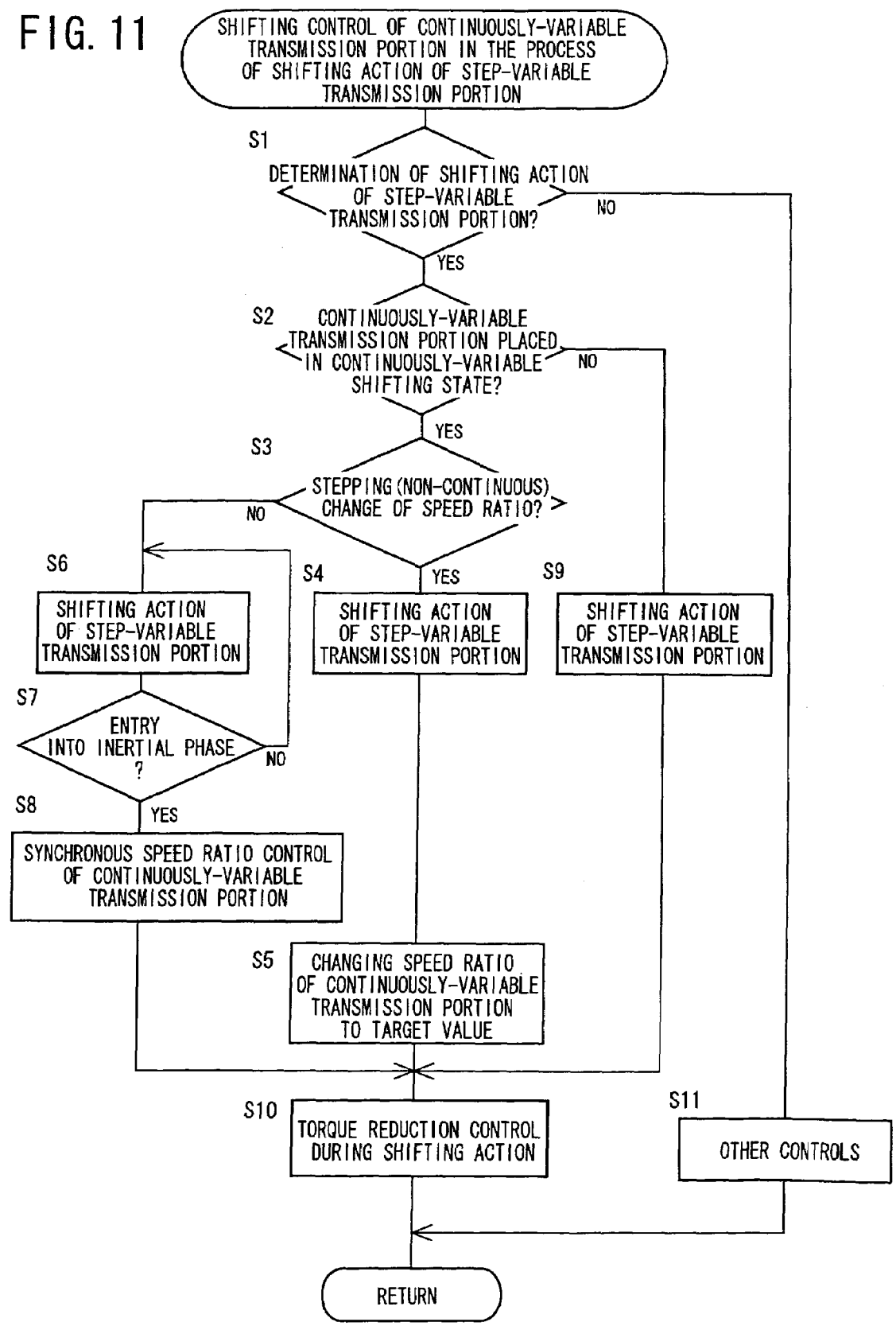
FIG. 11 is a flow chart illustrating a control operation of the electronic control device of FIG. 5, that is, a shifting control routine of a continuously-variable transmission portion upon a shifting action of the step-variable transmission portion.

FIG. 11 is a flow chart illustrating a major portion of a control operation of the electronic control device 40, that is, a shifting control routine of the continuously-variable transmission portion 11 upon a shifting action of the step-variable transmission portion 20. This shifting control routine is repeated executed with an extremely short cycle time of about several milliseconds to about several tens of milliseconds.

Figure 12:
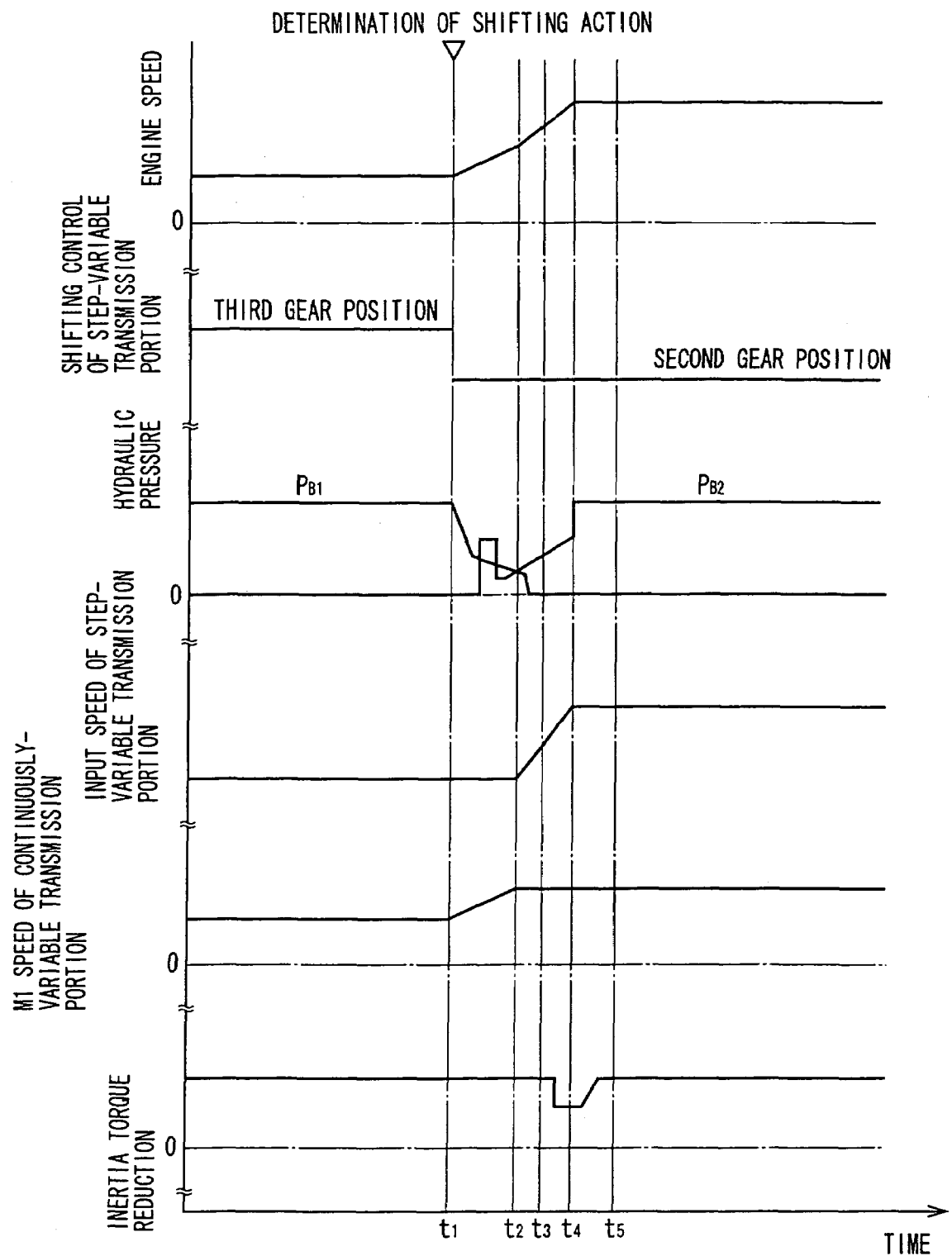
FIG. 12 is a time chart for explaining the control operation illustrated in the flow chart of FIG. 11, when the step-variable transmission portion is commanded to effect a power-on shift-down action from a third gear position to a second gear position while the transmission mechanism is placed in a continuously-variable shifting state.

FIG. 12 is a time chart for explaining the control operation illustrated in the flow chart of FIG. 11, when the step-variable transmission portion 20 is commanded to effect a power-on shift-down action from the third gear position to the second gear position while the transmission mechanism 10 is placed in the continuously-variable shifting state. In this case wherein the overall speed ratio is changed in the stepping manner, the speed ratio of the continuously-variable transmission portion 11 is controlled by the second shifting control means/

Figure 13:
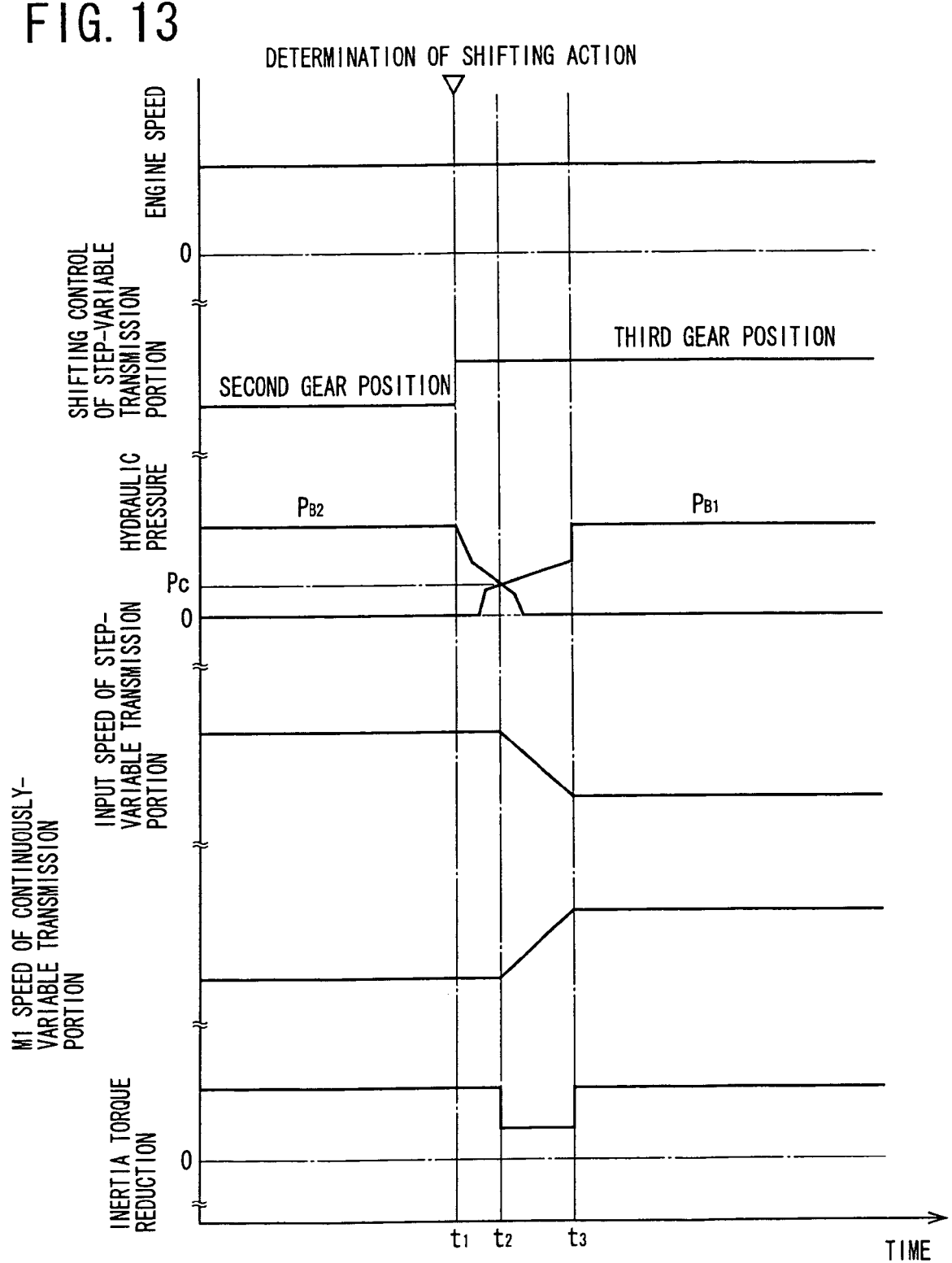
FIG. 13 is a time chart for explaining the control operation illustrated in the flow chart of FIG. 11, when the step-variable transmission portion is commanded to effect a power-on shift-up action from the second gear position to the third gear position while the transmission mechanism is placed in the continuously-variable shifting state.

FIG. 13 is a time chart for explaining the control operation illustrated in the flow chart of FIG. 11, when the step-variable transmission portion 20 is commanded to effect a power-on shift-up action from the second gear position to the third gear position while the transmission mechanism 10 is placed in the continuously-variable shifting state. In this case, the speed ratio of the continuously-variable transmission portion 11 is controlled by the first shifting control means.

Figure 14:
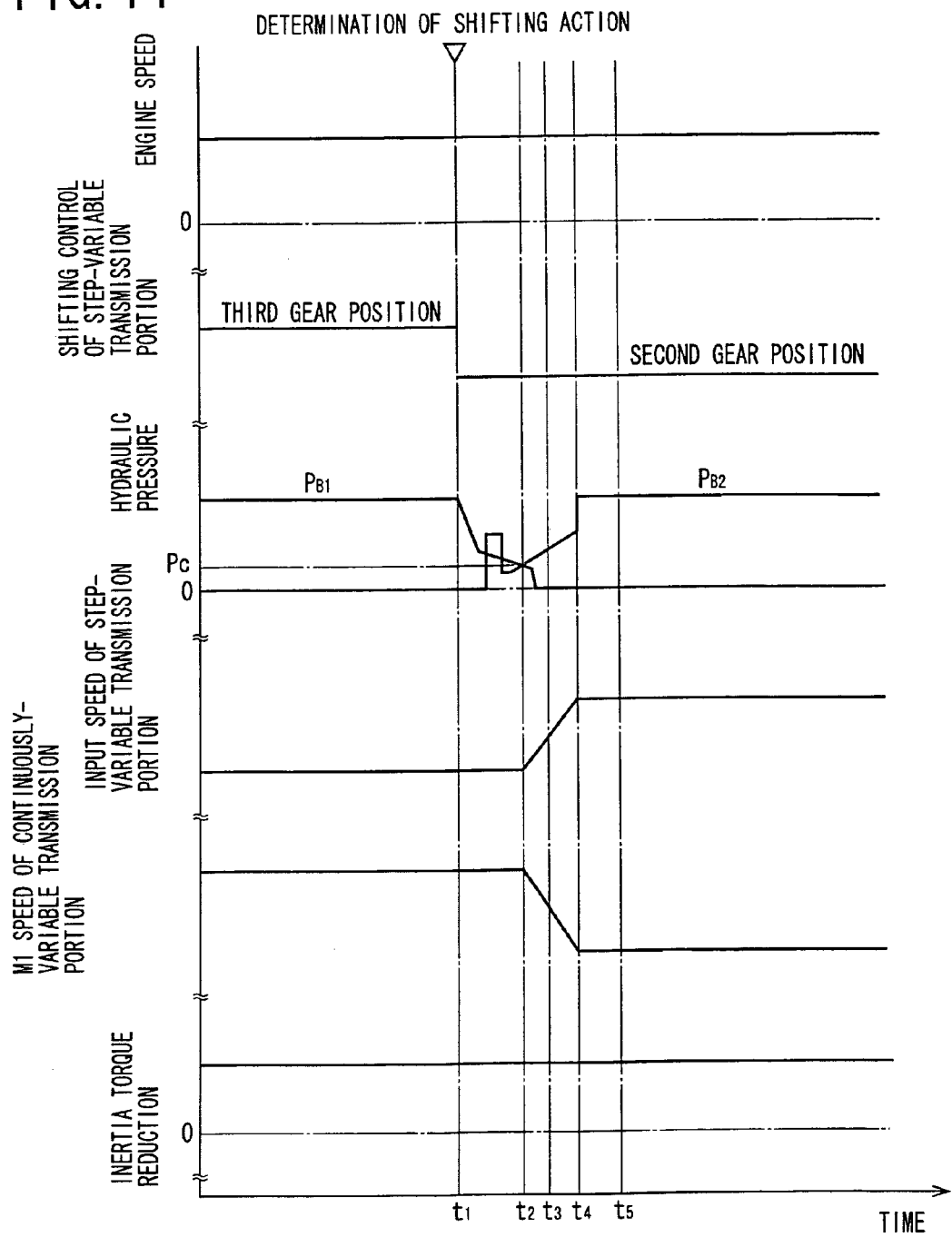
FIG. 14 is a time chart for explaining the control operation illustrated in the flow chart of FIG. 11, when the step-variable transmission portion is commanded to effect a coasting shift-down action from the third gear position to the second gear position while the transmission mechanism is placed in the continuously-variable shifting state.

FIG. 14 is a time chart for explaining the control operation illustrated in the flow chart of FIG. 11, when the step-variable transmission portion 20 is commanded to effect a coasting shift-down action from the third gear position to the second gear position while the transmission mechanism 10 is placed in the continuously-variable shifting state. In this case, the speed ratio of the continuously-variable transmission portion 11 is controlled by the first shifting control means.

Figure 15:
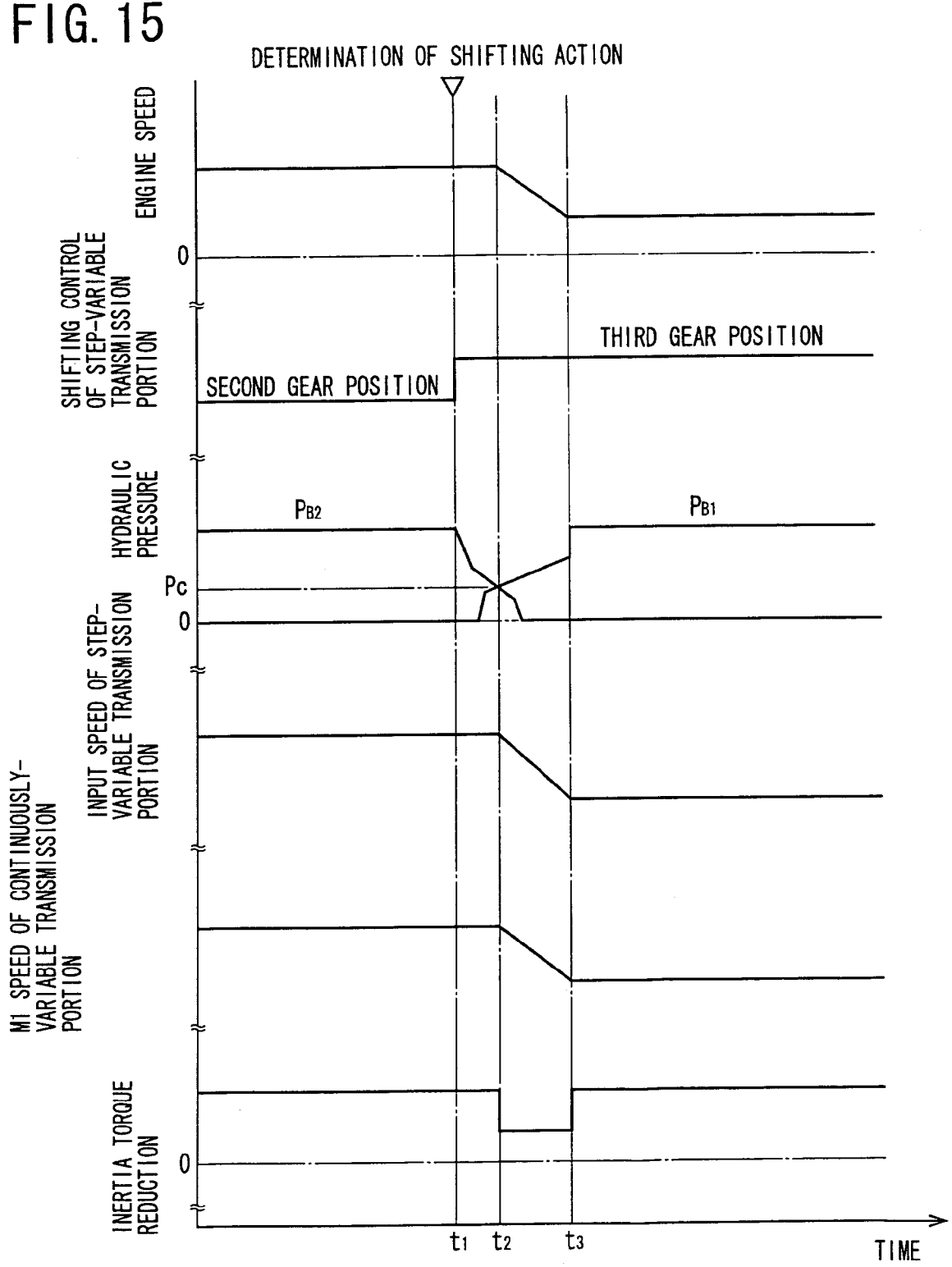
FIG. 15 is a time chart for explaining the control operation illustrated in the flow chart of FIG. 11, when the step-variable transmission portion is commanded to effect a shift-up action from the second gear position to the third gear position while the transmission mechanism is placed in a locked state (step-variable shifting state).

FIG. 15 is a time chart for explaining the control operation illustrated in the flow chart of FIG. 11, when the step-variable transmission portion 20 is commanded to effect a shift-up action from the second gear position to the third gear position while the transmission mechanism 10 is placed in the locked state (step-variable shifting state).

Figure 16:
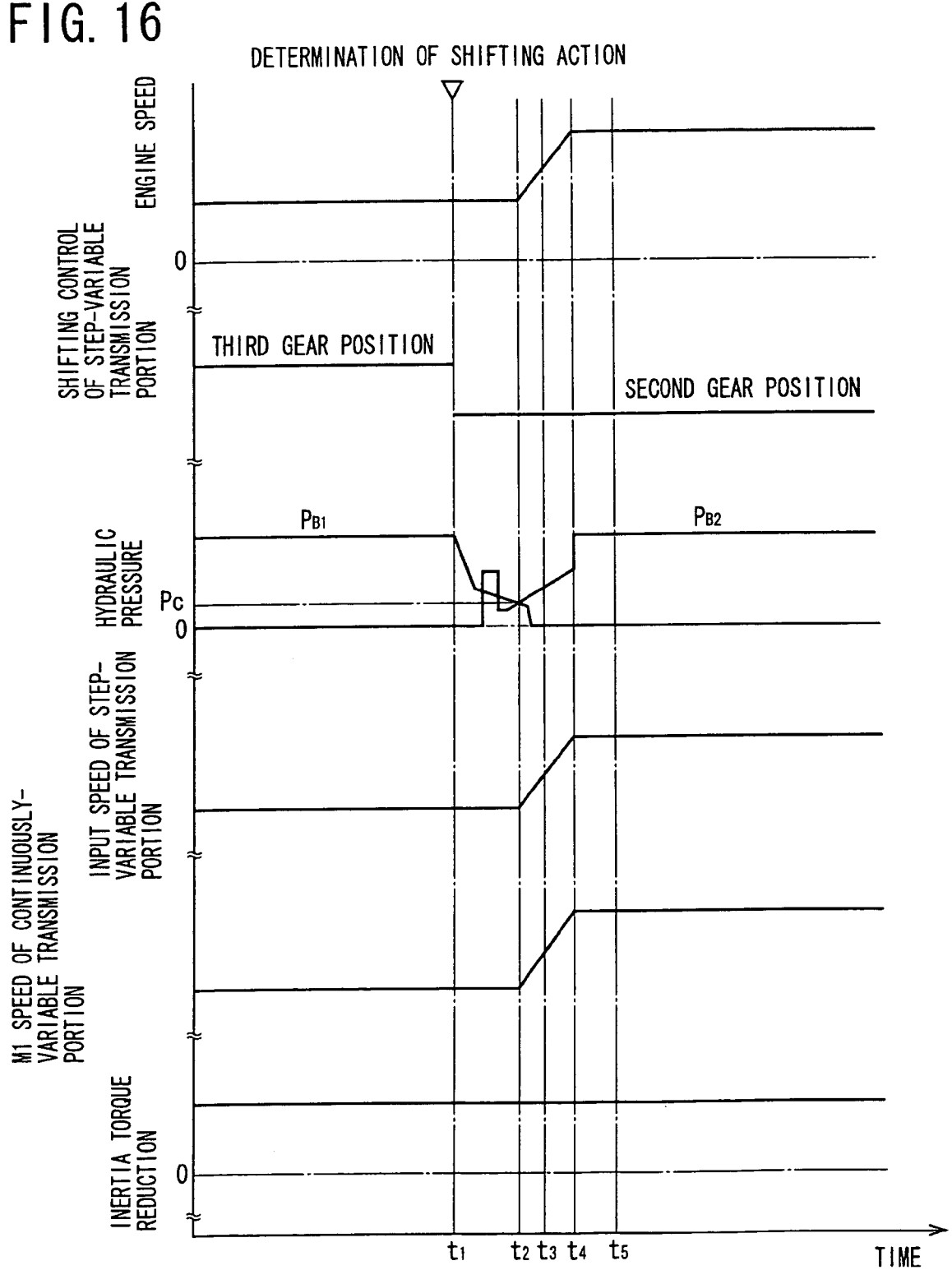
FIG. 16 is a time chart for explaining the control operation illustrated in the flow chart of FIG. 11, when the step-variable transmission portion is commanded to effect a coasting shift-down action from the third gear position to the second gear position while the transmission mechanism is placed in the locked state (step-variable shifting state).

FIG. 16 is a time chart for explaining the control operation illustrated in the flow chart of FIG. 11, when the step-variable transmission portion 20 is commanded to effect a coasting shift-down action from the third gear position to the second gear position while the transmission mechanism 10 is placed in the locked state (step-variable shifting state).

The shifting control routine is initiated with step S1 ("step" being hereinafter omitted) corresponding to the step-variable shifting control means 54, to determine whether a shifting action of the step-variable transmission portion 20 should take place. For example, this determination is made by determining whether a gear position to which the step-variable transmission portion 20 should be shifted has been determined according to the shifting map shown in FIG. 6 and on the basis of the vehicle condition represented by the vehicle speed V and the output torque $T_{OUT}$ of the step-variable transmission portion 20.

In the examples of FIG. 13 and FIG. 15, the determination of the shift-up action of the step-variable transmission portion 20 from the second gear position to the third gear position is made at a point of time t1. In the examples of FIG. 12, FIG. 15 and FIG. 16, the determination of the shift-down action of the step-variable transmission portion 20 from the third gear position to the second gear position is made at a point of time t1.

If an affirmative decision is made in S1, the control flow goes to S2 corresponding to the differential-state determining means 80, to determine whether the power distributing mechanism 16 is placed in the differential state, that is, whether the continuously-variable transmission portion 11 is placed in the continuously-variable shifting state. For example, this determination is made by determining whether the vehicle condition is in the continuously-variable shifting region which is defined by the switching map shown in FIG. 6 and in which the transmission mechanism 10 should be switched to the continuously-variable shifting state.

If a negative decision is obtained in S2, the control flow goes to S9 corresponding to the step-variable shifting control means 54, in which the step-variable transmission portion 20 is shifted to the gear position determined in S1.

At the point of time t1 in FIG. 15, the step-variable transmission portion 20 is commanded to be shifted up while the continuously-variable transmission portion 11 is held in its locked state, and the reduction of a hydraulic pressure $P_{B2}$ of the second brake B2 which is the frictional coupling device to be released is initiated. During a time period from the point of time t1 to a point of time t3, a hydraulic pressure $P_{B1}$ of the first brake B1 which is the frictional coupling device to be engaged is raised. At the point of time t3, the engaging action of the first brake B1 is completed, so that the shift-up action is terminated. In this example wherein the shift-up action is effected in the locked state of the continuously-variable transmission portion 11, the transmission 10 as a whole functions as a step-variable function. Accordingly, the engine speed $N_E$ is lowered in the process of the shift-up action, as indicated in FIG. 15, if the vehicle speed V is held constant.

At the point of time t1 in FIG. 16, the step-variable transmission portion 20 is commanded to be shifted down while the continuously-variable transmission portion 11 is held in its locked state, and the reduction of the hydraulic pressure $P_{B1}$ of the first brake B1 which is the frictional coupling device to be released is initiated. During the time period from the point of time t1 to the point of time t3, the hydraulic pressure $P_{B2}$ of the second brake B2 which is the frictional coupling device to be engaged is raised. At the point of time t3, the engaging action of the second brake B2 is completed, so that the shift-down action is terminated. In this example wherein the shift-down action is effected in the locked state of the continuously-variable transmission portion 11, the transmission mechanism 10 as a whole functions as a step-variable transmission. Accordingly, the engine speed $N_E$ is raised in the process of the shift-down action, as indicated in FIG. 16, if the vehicle speed V is held constant.

If an affirmative decision is obtained in S2, the control flow goes to S3 corresponding to the sped-ratio-change determining means 82, to determine whether the shifting action of the step-variable transmission portion 20 causes a non-continuous change of the overall speed ratio γT, that is, a stepping change of the overall speed ratio γT, due to an amount of change of the target value of the overall speed ratio γT which is larger than the predetermined threshold, as in the case of the shifting action which takes place as a result of a large amount of depressing operation or a releasing operation of the accelerator pedal as indicated by the arrow "c" or "d" of the solid line C in FIG. 6.

If an affirmative decision is obtained in S3, the control flow goes to S4 corresponding to the step-variable shifting control means 54, in which the step-variable transmission portion 20 is shifted to the gear position determined in S1. At substantially the same time, S5 corresponding to the hybrid control means 52 is implemented to control the speed ratio of the continuously-variable transmission portion 11 under the control of the second shifting control means. These steps S4 and S5 are implemented to effect a stepping change of the overall speed ratio.

At the point of time t1 in FIG. 12, the step-variable transmission portion 20 is commanded to be shifted down to the second gear position, and the reduction of the hydraulic pressure $P_{B1}$ of the first brake B1 which is the frictional coupling device to be released is initiated. During the time period from the point of time t1 to the point of time t4, the hydraulic pressure $P_{B2}$ of the second brake B2 which is the frictional coupling device to be engaged is raised. At the point of time t4, the engaging action of the second brake B2 is completed, so that the shift-down action of the step-variable transmission portion 20 is terminated. In this example, a rise of the first electric motor speed $N_{M1}$ is initiated substantially concurrently with the determination of the shifting action, so that the speed ratio γ0 of the continuously-variable transmission is increased to raise the engine speed $N_E$. In the process of the shift-down action of the step-variable transmission portion 20, the input speed of the step-variable transmission portion 20 (rotating speed of the power transmitting member 18) is raised, and the engine speed $N_E$ is also raised. In this example, therefore, the speed ratio of the continuously-variable transmission 11 is changed to change the overall speed ration γT in a stepping manner, namely, not continuously, toward the target value, without synchronization with the shifting action of the step-variable transmission portion 20, whereby the shifting response is improved.

If a negative decision is obtained in S3, the control flow goes to S6 corresponding to the step-variable shifting control means 54, in which the step-variable transmission portion 20 is shifted to the gear position determined in S1.

At the point of time t1 in FIG. 13, the step-variable transmission portion 20 is commanded to be shifted up to the third gear position, and the reduction of the hydraulic pressure $P_{B1}$ of the second brake B2 which is the frictional coupling device to be released is initiated. During the time period from the point of time t1 to the point of time t3, the hydraulic pressure $P_{B2}$ of the first brake B1 which is the frictional coupling device to be engaged is raised. At the point of time t3, the engaging action of the first brake B1 is completed, so that the shift-up action of the step-variable transmission portion 20 is terminated.

At the point of time t1 in FIG. 14, the step-variable transmission portion 20 is commanded to be shifted down to the second gear position, and the reduction of the hydraulic pressure $P_{B1}$ of the first brake B1 which is the frictional coupling device to be released is initiated. During the time period from the point of time t1 to the point of time t4, the hydraulic pressure $P_{B2}$ of the second brake B2 which is the frictional coupling device to be engaged is raised. At the point of time t4, the engaging action of the second brake B2 is completed, so that the shift-down action of the step-variable transmission portion 20 is terminated.

The control flow then goes to S7 corresponding to the inertia-phase-entry determining means 84, to determine whether the step-variable transmission portion 20 has entered the inertia-phase in the process of the shifting action. For example, the inertial-phase-entry determining means 84 determines whether the amount of change of the actual second electric motor speed $N_{M2}$ has reached the predetermined value which is obtained by experimentation to make the determination as to whether the inertia phase of the shifting action is initiated. Alternatively, the determination is made by determining whether the predetermined time has passed after the moment of the determination of the shifting action by the step-variable shifting control means 54. This predetermined time is obtained by experimentation, as a length of time from the moment of the determination of the shifting action to the moment at which the frictional coupling device in the process of its engaging action begins to transmit a torque. Further alternatively, the determination is made by determining whether the transient hydraulic pressure (command value) applied to the frictional coupling device in its engaging action has reached the predetermined value $P_C$, which is obtained by experimentation, as the hydraulic pressure at which the frictional coupling device in its engaging action begins to transmit the torque.

At the point of time t3 in FIG. 13, the entry of the step-variable transmission portion 20 into the inertia phase has been determined, by confirming: that the amount of change of the actual second electric motor speed $N_{M2}$ has reached the predetermined value obtained by experimentation to make the determination as to whether the inertia phase is initiated; that the predetermined time obtained by experimentation to determine whether the frictional coupling device in the process of its engaging action begins to transmit a torque; or that the transient hydraulic pressure (command value) applied to the frictional coupling device in its engaging action has reached the predetermined value $P_C$ obtained by experimentation as the hydraulic pressure at which the frictional coupling device in its engaging action begins to transmit the torque. In the example of FIG. 13, the frictional coupling device in the engaging action is the first brake B1, and the hydraulic pressure $P_{B1}$ of this first brake B1 is checked. In the example of FIG. 14, the frictional coupling device in the engaging action is the second brake B2, and the hydraulic pressure $P_{B2}$ of this second brake B2 is checked.

If a negative decision is obtained in S7, this step S7 is repeatedly implemented. When an affirmative decision is obtained in S7, the control flow goes to S8 corresponding to the hybrid control means 52, in which the speed ratio of the continuously-variable transmission portion 11 is controlled by the first shifting control means. These steps S6-S8 are implemented to continuously change the overall speed ratio γT of the transmission mechanism 10 during the shifting action of the step-variable transmission portion 20. The step S8 may be formulated also to determine whether the step-variable transmission portion 20 has entered the inertia phase. In this case, the step S7 is eliminated.

During a time period from the point of time t2 to the point of time t3 in FIG. 13, or during a time period from the point of time t2 to the point of time t4 in FIG. 14, the speed ratio of the continuously-variable transmission portion 11 is changed in a direction opposite to the direction of the stepping change of the speed ratio of the step-variable transmission portion 20 as a result of the shifting action, by an amount equal to the amount of change of the speed ratio of the step-variable transmission portion 20, during the inertia phase of the step-variable transmission portion 20, for the purpose of preventing a change of the overall speed ratio γT of the transmission mechanism 10, namely, a change of the engine speed $N_E$, during the shifting action of the step-variable transmission portion 20.

During the shifting action in S4 and S5, the shifting action in S6-S8 and the shifting action in S9, the torque reduction control to reduce the input torque TIN of the step-variable transmission portion 20 is implemented in S10 corresponding to the torque-reduction control means 86.

An inertia torque is generated due to an increase of the output torque $T_{OUT}$ as a result of a decrease of the rotating speed of the rotary elements of the step-variable transmission portion 20 or a decrease of the rotating speed of the rotary elements of the continuously-variable transmission portion 11, for example. Alternatively, an inertia torque is generated due to an increase of the output torque $T_{OUT}$ as a result of a decrease of the engine speed $N_E$ during a shift-up action of the step-variable transmission portion 20. Alternatively, there is a risk of generation of an engaging shock of the frictional coupling device to a torque variation at the end of the engaging action of the frictional coupling device to effect the shifting action of the step-variable transmission portion 20. In view of these facts, the step S10 is implemented to reduce the input torque $T_{IN}$ of the step-variable transmission portion 20 for offsetting or absorbing the above-indicted inertia torque to some extent, or for offsetting the toque variation to some extent to reduce the engaging shock of the frictional coupling device. For example, the input torque $T_{IN}$ is reduced by implementing the engine torque reduction control to reduce the engine torque $T_E$, or the electric motor torque reduction control using the second electric motor M2. However, the torque reduction control in S10 need not be implemented during deceleration of the vehicle without an operation of the accelerator pedal, that is, during a coasting shift-down of the step-variable transmission portion 20.

During a time period from the point of time t3 to the point of time t5 in FIG. 12, wherein a power-on shift-down action of the step-variable transmission 20 takes place, the input torque $T_{IN}$ is reduced in a terminal portion of the shift-down action, to offset the torque variation at the end of the engaging action of the frictional coupling device to effect the shift-down action, to some extent, for thereby reducing the engaging shock of the frictional coupling device.

During a time period from the point of time t2 to the point of time t3, wherein the engine speed $N_E$ does not change during the shifting action, the input torque $T_{IN}$ is reduced to offset to some extent the inertia torque generated due to an increase of the output torque $T_{OUT}$ as a result of a decrease of the rotating speed of the rotary elements of the step-variable transmission portion 20 or a decrease of the rotating speed of the rotary elements of the continuously-variable transmission portion 11.

In the example of FIG. 14 wherein a coasting shift-down action of the step-variable transmission portion 20 takes place, the torque reduction control is not implemented. In the case of a power-on shift-down action of the step-variable transmission portion 20, however, the torque reduction control to offset the inertia torque may be implemented, as in the case of FIG. 13.

During a time period from the point of time t2 to the point of time t3 in FIG. 15, the input torque $T_{IN}$ is reduced to offset to some extent the inertia torque generated due to an increase of the output torque $T_{OUT}$ as a result of a change of the engine speed $N_E$, a decrease of the rotating speed of the rotary elements of the step-variable transmission portion 20, or a decrease of the rotating speed of the rotary elements of the continuously-variable transmission portion 11. In this example of FIG. 15 in which the continuously-variable transmission portion 11 is held in its locked state, the engine speed $N_E$ may be forcibly changed to a value corresponding to the gear position established after the shifting action, by using the first electric motor M1 and/or the second electric motor M2, such that the change of the engine speed $N_E$ is initiated at the point of time t2, substantially in synchronization of the entry into the inertia phase. Further, the hydraulic pressure $P_{B1}$ of the frictional coupling device in its engaging action may be raised so as to absorb a larger value of the inertia during the shifting action causing a change of the engine speed $N_E$, than in the example of FIG. 13 in which the continuously-variable transmission 11 is held in its differential state. That is, the hydraulic pressure $P_{B1}$ may be raised so as to absorb an increase of the inertial mass of the engine 8 during the shifting action of the step-variable transmission 20, as viewed on the side of the step-variable transmission portion 20 while the rotating speed of the power transmitting member 18 is changed in the process of the shifting action of the step-variable transmission portion 20.

In the example of FIG. 16 wherein a coasting shift-down action of the step-variable transmission portion 20 takes place, the torque reduction control is not implemented. In the case of a power-on shift-down action of the step-variable transmission portion 20, however, the torque reduction control to offset the inertia torque may be implemented, as in the case of FIG. 15. Further, the hydraulic pressure $P_{B2}$ of the frictional coupling device in its engaging action may be raised so as to absorb a larger value of the inertia during the shifting action causing a change of the engine speed $N_E$, than in the example of FIG. 14 in which the continuously-variable transmission 11 is held in its differential state. In this example of FIG. 16 in which the continuously-variable transmission portion 11 is held in its locked state, the engine speed $N_E$ may be forcibly changed to a value corresponding to the gear position established after the shifting action, by using the first electric motor M1 and/or the second electric motor M2, such that the change of the engine speed $N_E$ is initiated at the point of time t2, substantially in synchronization of the entry into the inertia phase. In this case of the synchronous control, the hydraulic pressure $P_{B2}$ may be made lower than in the case where the synchronous control is not implemented.

If a negative decision is obtained in S1, the control flow goes to S11 in which controls other than the controls implemented during the shifting action of the step-variable transmission portion 20 are implemented by various control means of the control device 40. Alternatively, one cycle of execution of the present shifting control routine is terminated. for instance, the continuously-variable transmission portion 11 is controlled by the hybrid control means 52 on the basis of the vehicle condition, while the transmission mechanism 10 is placed in the continuously-variable shifting state.

In the present embodiment described above, the hybrid control means 52 selectively activates the first shifting control means and the second shifting control means, on he basis of the manner of change of the overall speed ratio γT, upon a shifting action of the step-variable transmission portion 20. The first shifting control means is arranged to control the speed ratio of the continuously-variable transmission portion 11 such that the amount of change of the engine speed $N_E$ is held within the predetermined threshold $N_E'$. The second shifting control means is arranged to control the speed ratio of the continuously-variable transmission portion 11 independently of the shifting action of the step-variable transmission portion 20, so that the overall speed ratio γT can be changed in steps during the shifting action of the step-variable transmission portion 20, as in a step-variable transmission, whereby the shifting response is improved.

In other words, the hybrid control means 52 controls the speed ratio of the continuously-variable transmission portion 11 during the shifting action of the step-variable transmission portion 20 such that the overall speed ratio γT can be changed either continuously under the control of the first shifting control means, or non-continuously under the control of the second shifting control means, so that the overall speed ratio γT can be changed in steps during the shifting action of the step-variable transmission portion 20, as in a step-variable transmission, whereby the shifting response is improved.

When the speed ratio of the continuously-variable transmission portion 11 is controlled by the second shifting control means to change the overall speed ratio γT non-continuously, for example, the overall speed ratio γT is changed in steps during the shifting action of the step-variable transmission portion 20, such that the amount of change of the speed ratio of the continuously-variable transmission portion 11 is added to (or subtracted from) the amount of stepping change of the speed ratio of the step-variable transmission portion 20, so that the shifting response is made higher in this case of stepping change of the overall speed ratio γT, than in the case of continuous change of the overall speed ratio γT.

When the speed ratio of the continuously-variable transmission portion 11 is controlled by the first shifting control means to change the overall speed ratio γT continuously, on the other hand, the speed ratio of the continuously-variable transmission portion 11 is changed so as to restrict the amount of change of the overall speed ratio γT, in spite of the stepping change of the speed ratio of the step-variable transmission portion 20, so that the shifting shock is reduced, and the transmission mechanism 10 as a whole functions as a continuously-variable transmission, whereby the fuel economy is improved.

The other embodiments of the present invention will be described. In the following descriptions, the same reference as used in the preceding embodiment signs will be used to identify the corresponding elements which will not be described.

Embodiment 2

Figures 17, 18:
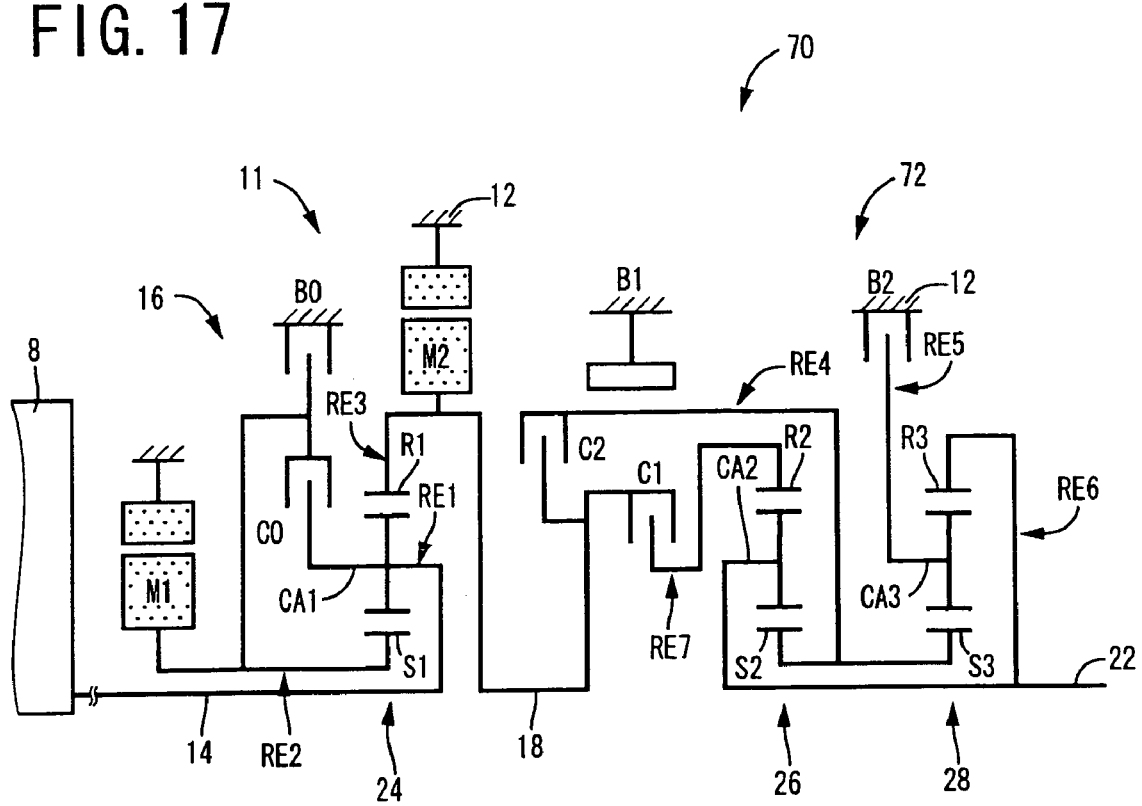
FIG. 17 is a schematic view corresponding to that of FIG. 1, showing an arrangement of another hybrid vehicle drive system to which the present invention is also applicable.
FIG. 18 is a table corresponding to that of FIG. 2, indicating shifting actions of the hybrid vehicle drive system of FIG. 17, which is operable in a selected one of the continuously-variable and step-variable shifting states, in relation to different combinations of operating states of hydraulically operated frictional coupling devices to effect the respective shifting actions.
Figure 20:
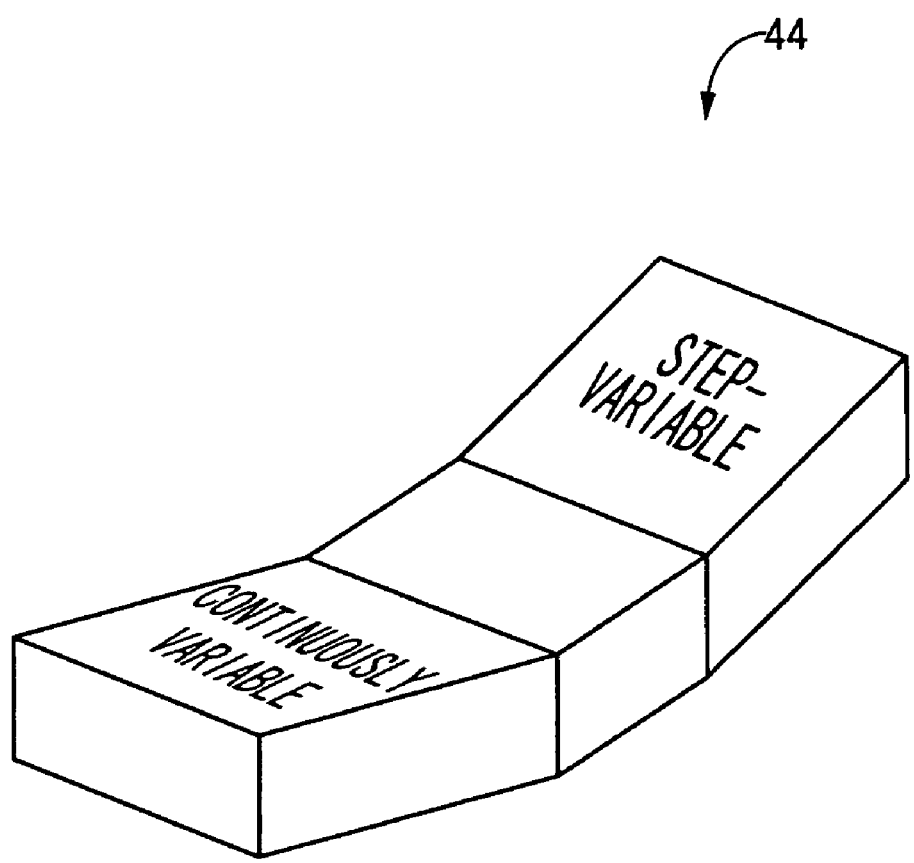
FIG. 20 is a perspective view showing an example of a manually operable shifting-state selecting device in the form of a seesaw switch operated by a user to select the shifting state.

FIG. 17 is a schematic view for explaining an arrangement of a transmission mechanism 70 in another embodiment of this invention, and FIG. 18 a table indicating a relationship between the gear positions of the transmission mechanism 70 and different combinations of engaged states of the hydraulically operated frictional coupling devices for respectively establishing those gear positions, while FIG. 20 is a collinear chart for explaining a shifting operation of the transmission mechanism 70.

The transmission mechanism 70 includes the continuously-variable transmission portion 11 having the first electric motor M1, power distributing mechanism 16 and second electric motor M2, as in the preceding embodiment. The transmission mechanism 70 further includes an step-variable transmission portion 72 having three forward drive positions. The step-variable transmission portion 72 is disposed between the continuously-variable transmission portion 11 and the output shaft 22 and is connected in series to the continuously-variable transmission portion 11 and output shaft 22 through the power transmitting member 18. The power distributing mechanism 16 includes the single-pinion type first planetary gear set 24 having a gear ratio ρ1 of about 0.418, for example, and the switching clutch C0 and the switching brake B0. The step-variable transmission portion 72 includes the single-pinion type second planetary gear set 26 having a gear ratio ρ2 of about 0.532, for example, and the single-pinion type third planetary gear set 28 having a gear ratio ρ3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 18. Those gear positions have respective speed ratios γ (input shaft speed $N_{IN}$/output shaft speed $N_{OUT}$) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the continuously-variable transmission portion 11 which is placed in the fixed-speed-ratio shifting state by engagement of the switching clutch C0 or switching brake B0. Further, a continuously variable transmission is constituted by the transmission portion 20, and the continuously-variable transmission portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 18. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 18, so that the continuously-variable transmission portion 11 functions as the continuously variable transmission, while the step-variable transmission portion 72 connected in series to the continuously-variable transmission portion 11 functions as the step-variable transmission, whereby the speed of the rotary motion transmitted to the step-variable transmission portion 72 placed in one of the first through third gear positions, namely, the rotating speed of the power transmitting member 18 is continuously changed, so that the speed ratio of the transmission mechanism 10 when the step-variable transmission portion 72 is placed in one of those gear positions is continuously variable over a predetermined range. Accordingly, the total speed ratio of the step-variable transmission portion 72 is continuously variable across the adjacent gear positions, whereby the overall speed ratio γT of the transmission mechanism 70 a whole is continuously variable.

Figure 19:
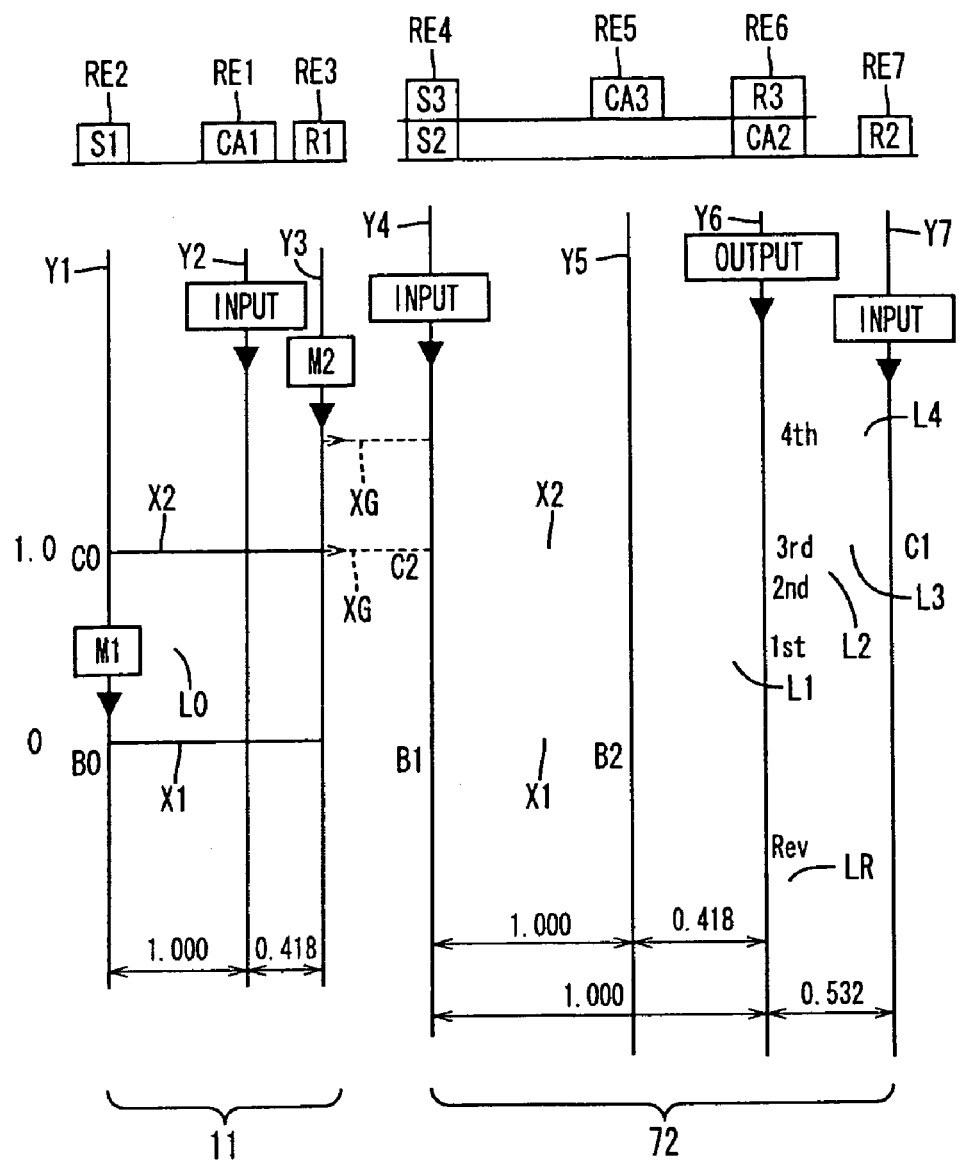
FIG. 19 is a collinear chart corresponding to that of FIG. 3, indicating relative rotating speeds of the rotary elements of the hybrid vehicle drive system of FIG. 17 in the step-variable shifting state, in the different gear positions.

The collinear chart of FIG. 19 indicates, by straight lines, a relationship among the rotating speeds of the rotary elements in each of the gear positions of the transmission mechanism 70, which is constituted by the continuously-variable transmission portion 11 functioning as the continuously-variable shifting portion or first shifting portion, and the step-variable transmission portion 72 functioning as the step-variable shifting portion or second shifting portion. The collinear chart of FIG. 21 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiment, except in that the third rotary element RE3 (first ring gear R1) is connected to the power transmitting member 18 and the second electric motor M1.

In FIG. 19, four vertical lines Y4, Y5, Y6 and Y7 corresponding to the step-variable transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the step-variable transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the step-variable transmission portion 72, and the seventh rotary element RE7 is selectively connected to the power transmitting member 18 through the first clutch C1.

When the first clutch C1 and the second brake B2 are engaged, the step-variable transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 19. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the continuously-variable transmission portion 11. When the switching clutch B0 is engaged in place of the switching clutch C0, the sixth rotary element RE6 is rotated at a speed higher than the engine speed $N_E$, with the drive force received from the continuously-variable transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the continuously-variable transmission portion 11 functioning as the continuously-variable shifting portion or first shifting portion, and the step-variable transmission portion 72 functioning as the step-variable (automatic) shifting portion or second shifting portion, and the output shaft 22 is provided with the third electric motor M3, so that the present transmission mechanism 70 has advantages similar to those of the first embodiment.

Embodiment 3

FIG. 20 shows an example of a seesaw switch 44 (hereinafter referred to as "switch 44") functioning as a shifting-state selecting device manually operable to select the differential state (non-locked state) and or non-differential state (locked state) of the power distributing mechanism 16, that is, to select the continuously-variable shifting state or step-variable shifting state of the transmission mechanism 10. This switch 44 permits the user to select the desired shifting state during running of the vehicle. The switch 44 has a continuously-variable-shifting running button labeled "STEP-VARIABLE" for running of the vehicle in the continuously-variable shifting state, and a step-variable-shifting running button labeled "CONTINUOUSLY-VARIABLE" for running of the vehicle in the step-variable shifting state, as shown in FIG. 17. When the continuously-variable-shifting running button is depressed by the user, the switch 44 is placed in a continuously-variable shifting position for selecting the continuously-variable shifting state in which the transmission mechanism 10 is operable as the electrically controlled continuously variable transmission. When the step-variable-shifting running button is depressed by the user, the switch 44 is placed in a step-variable shifting position for selecting in the step-variable shifting state in which the transmission mechanism is operable as the step-variable transmission.

In the preceding embodiments, the shifting state of the transmission mechanism 10 is automatically switched on the basis of the vehicle condition and according to the switching boundary line map shown in FIG. 6 by way of example. However, the shifting state of the transmission mechanism 10 may be switched by a manual operation of the switch 44, in place of or in addition to the automatic switching operation. Namely, the switching control means 50 may be arranged to selectively place the transmission mechanism 10 in the continuously-variable shifting state or the step-variable shifting state, depending upon whether the switch 44 is placed in its continuously-variable shifting position or step-variable shifting position. For instance, the user manually operates the switch 44 to place the transmission mechanism 10 in the continuously-variable shifting state when the user likes the transmission mechanism 10 to operate as a continuously variable transmission or wants to improve the fuel economy of the engine, or alternatively in the step-variable shifting state when the user likes a rhythmical change of the engine speed as a result of a shifting action of the step-variable transmission.

The switch 44 may have a neutral position in which none of the continuously-variable and step-variable shifting states are selected. In this case, the switch 44 may be placed in its neutral position when the user has not selected the desired shifting state or likes the transmission mechanism 10 to be automatically placed in one of the continuously-variable and step-variable shifting states.

Where the shifting state of the transmission mechanism 10 is not automatically selected, but is manually selected by a manual operation of the switch 44, step S3 in the flow chart of FIG. 11 is formulated such that the determination as to whether the power distributing mechanism 16 is placed in the differential state, that is, whether the continuously-variable transmission portion 11 is placed in the continuously-variable shifting state, is effected depending upon whether the switch 44 has been operated to select the differential state of the power distributing mechanism 16 or the continuously-variable shifting state of the transmission mechanism 10.

While the preferred embodiments of this invention have been described in detail by reference to the accompanying drawings, it is to be understood that the present invention may be otherwise embodied.

In the illustrated embodiments, the power distributing mechanism 16 is switchable between the differential state and the non-differential state, so that the transmission mechanism 10, 70 is switchable between the continuously-variable shifting state in which the transmission mechanism functions as an electrically controlled continuously variable transmission, and the step-variable shifting state in which the transmission mechanism functions as a step-variable transmission. However, the transmission mechanism 10, 70 need not be switchable to the step-variable shifting state. That is, the principle of the present invention is applicable to a transmission mechanism wherein the continuously-variable transmission portion (differential portion) 11 is not provided with the switching clutch C0 and the switching brake B0, and functions simply as an electrically controlled continuously variable transmission (electrically controlled differential device). In this case, the switching control means 50, the high-speed-gear determining means 62 and the differential-state determining means 80 need not be provided, and the step S2 in the flow chart of FIG. 11 to determine whether the power distributing mechanism 16 is placed in the differential state is not necessary, so that the step S9 is not necessary, either. It is also noted that the continuously-variable transmission portion 11 may be replaced by a continuously variable transmission (CVT) well known in the art.

In the illustrated embodiments, the transmission mechanism 10, 70 is switchable between its continuously-variable shifting state and the step-variable shifting states by placing the continuously-variable transmission portion 11 (power distributing mechanism 16) selectively in one of its differential state in which the continuously-variable transmission portion 11 is operable as the electrically controlled continuously variable transmission, and the non-differential state (locked state) in which the continuously-variable transmission portion 11 is not operable as the electrically controlled continuously variable transmission. However, the continuously-variable transmission portion 11 placed in its differential state can be operable as the step-variable transmission the speed ratio of which is variable in steps rather than continuously. In other words, the differential and non-differential states of the continuously-variable transmission portion 11 do not respectively correspond to the continuously-variable and step-variable shifting states of the transmission mechanism 10, 70, and therefore the continuously-variable transmission portion 11 need not be switchable between the continuously-variable and step-variable shifting states. The principle of this invention is applicable to any transmission mechanism which is switchable between the differential and non-differential states, or wherein the continuously-variable transmission portion 11 (power distributing mechanism 16) is switchable between the differential and non-differential states.

The present embodiment is arranged such that the speed ratio of the continuously-variable transmission portion 11 is controlled so as to prevent a change of the engine speed $N_E$, that is, a change of the overall speed ratio $\gamma T$ of the transmission mechanism 10, during the shifting action of the step-variable transmission portion 20, as illustrated in the time chart of FIGS. 13 and 14. However, the speed ratio of the continuously-variable transmission portion 11 need not be controlled so as to prevent the change of the engine speed $N_E$, but may be controlled so as to reduce the amount of stepping change of the engine speed $N_E$, for permitting a continuous change of the engine speed $N_E$. Some advantage of the present invention is obtained according to this modification.

In the embodiments described above, the differential-state determining means 80 (step S2 of FIG. 11) is arranged to determine whether the power distributing mechanism 16 is placed in the differential state or not, by determining whether the vehicle condition is in the continuously-variable shifting region defined by the switching map shown in FIG. 6 by way of example. However, the determination as to whether the power distributing mechanism 16 is placed in the differential state may be made on the basis of a determination by the switching control means 50 as to whether the transmission mechanism 10 is in the step-variable shifting region or in the continuously-variable shifting region.

In the embodiments described above, the speed-ratio-change determining means 82 (step S3 of FIG. 11) is arranged to determine a stepping change of the overall speed ratio $\gamma T$, if the amount of change of the target value of the overall speed ratio $\gamma T$ is larger than the predetermined threshold. However, the stepping change of the overall speed ratio $\gamma T$ may be determined if the rate of change of the target value of the overall speed ratio $\gamma T$ is higher than a predetermined threshold. The threshold of the rate of change of the target value of the overall speed ratio $\gamma T$ is obtained by experimentation as the rate above which the change of the target value is not considered continuous (that is, considered non-continuous).

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiments, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18 or output shaft 20, respectively, through gears or belts.

Although the power distributing mechanism 16 in the illustrated embodiments is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the transmission mechanism 10, 70 in the illustrated embodiments, the switching clutch C0 need not be engaged to establish the neutral position.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

While the second electric motor M2 is connected to the power transmitting member 18 or the output shaft 22 in the illustrated embodiments, the second electric motor M2 may be connected to a rotary member of the step-variable transmission portion 20, 70.

In the illustrated embodiments, the step-variable transmission portion 20, 72 is disposed in the power transmitting path between the drive wheels 38, and the power transmitting member 18 which is the output member of the continuously-variable transmission portion 11 or power distributing mechanism 16. However, the step-variable transmission portion 20, 72 may be replaced by any other type of power transmitting device such: an automatic transmission in the form of a continuously variable transmission (CVT); an automatic transmission which is a permanent-mesh parallel-two-axes type transmission well known as a manual transmission and which is automatically shifted by select cylinders and shift cylinders; and a manual transmission of synchronous meshing type which is manually shifted. Where the step-variable transmission portion is replaced by the continuously variable transmission (CVT), the transmission mechanism as a whole is placed in the step-variable shifting state when the power distributing mechanism 16 is placed in its fixed-speed-ratio shifting state. In the step-variable shifting state, the drive force is transmitted primarily through a mechanical power transmitting path, and not through an electric path. The above-indicated continuously variable transmission may be controlled to change its speed ratio to a selected one of a plurality of fixed values which correspond to respective gear position of a step-variable transmission and which are stored in a memory, so that the speed ratio of the transmission mechanism can be changed in steps.

While the step-variable transmission portion 20, 72 in the preceding embodiments is connected in series to the continuously-variable transmission portion 11 through the power transmitting member 18, the step-variable transmission portion 20, 72 may be mounted on and disposed coaxially with a counter shaft which is parallel to the input shaft 14. In this case, the continuously-variable transmission portion 11 and the step-variable transmission portion 20, 72 are operatively connected to each other through a suitable power transmitting device or a set of two power transmitting members such as a pair of counter gears, and a combination of a sprocket wheel and a chain.

The power distributing mechanism 16 provided as a differential mechanism in the preceding embodiments may be replaced by a differential gear device including a pinion rotated by the engine, and a pair of bevel gears which are respectively operatively connected to the first and second electric motors M1, M2.

While the power distributing mechanism 16 in the illustrated embodiments is constituted by one planetary gear set 24, it may be constituted by two or more planetary gear sets so that the power distributing mechanism 16 is operable as a transmission having three or more gear positions in the non-differential state (fixed-speed-ratio shifting state).

The shifting device 90 in the illustrated embodiments is provided with the shift lever 92 for selecting a plurality of shift positions. However, the shift lever 92 may be replaced by a pushbutton switch, a slide type switch or any other switch for selecting a plurality of shift positions, a device operable to select a plurality of shift positions in response to a voice of the vehicle operator rather than a manual operation of the vehicle operator, or a device operable to select a plurality of shift positions in response to a foot operation of the vehicle operator. When the shift lever 92 is placed in the position M, the number of the selectable gear positions can be selected. However, the highest gear position selectable can be selected by the shift lever 92 placed in the position M. In this case, the step-variable transmission 20, 72 is shifted when the highest gear position selectable is changed. When the shift lever 92 is manually operated from the position M to the shift-up position "+" or the shift-down position "−", the step-variable transmission 20 is shiftable to any one of the first through fourth gear positions.

While the switch 44 is of a seesaw type switch in the preceding embodiments, the seesaw switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state (differential state) and the step-variable shifting state (non-differential state). The seesaw switch 44 may or may not have a neutral position. Where the seesaw switch 44 does not have the neutral position, an additional switch may be provided to enable and disable the seesaw switch 44. The function of this additional switch corresponds to the neutral position of the seesaw switch 44. The seesaw switch 44 may be replaced by a switching device operable by a voice generated by the vehicle operator or a foot of the vehicle operator, rather than by hand, to select one of the continuously-variable shifting state (differential state) and the step-variable shifting state (non-differential state).

It is to be understood that the embodiments of the invention have been descried for illustrative purpose only, and that the present invention may be embodied with various changes and modifications which may occur to those skilled in the art.

What is claimed is:

1. A control apparatus for a vehicular drive system provided with a transmission mechanism constituted by a first transmission portion in the form of a continuously-variable transmission portion operable as an electrically controlled continuously variable transmission, and a second transmission portion, said continuously-variable transmission portion having a differential mechanism operable to distribute an output of an engine to a first electric motor and a power transmitting member, and a second electric motor disposed in a power transmitting path between the power transmitting member and a drive wheel of a vehicle, said second transmission portion constituting a part of said power transmitting path, said control apparatus comprising:

a continuous-transmission control device including, a first shifting control portion that controls a speed ratio of said continuously-variable transmission portion, so as to prevent a change of a speed of said engine due to a change of an input speed of said second transmission portion upon a shifting action of said second transmission portion, and a second shifting control portion that controls the speed ratio of said continuously-variable transmission portion independently of said shifting action of said second transmission portion, wherein said continuous-transmission control device selectively activates said first shifting control portion and said second shifting control portion, on the basis of a manner in which an overall speed ratio of said transmission mechanism is changed, and wherein when an amount of change of the overall speed ratio is greater than a first predetermined value or a rate of change of the overall speed ratio toward a target value thereof is greater than a second predetermined value, the continuous-transmission control device performs a non-continuous change of the overall speed ratio with the second shifting control portion by adding an amount of change of the speed ratio of the continuously-variable transmission portion to an amount of change of the second transmission portion.

2. The control apparatus according to claim 1, wherein said continuous-transmission control device activates said first shifting control portion when the overall speed ratio of said transmission mechanism is changed continuously, and activates said second shifting control portion when the overall speed ratio of the transmission mechanism is changed non-continuously.

3. A control apparatus for a vehicular drive system provided with a transmission mechanism constituted by a differential portion having a differential mechanism operable to distribute an output of an engine to a first electric motor and a power transmitting member, and a second electric motor disposed in a power transmitting path between the power transmitting member and a drive wheel of a vehicle, and a transmission portion which constitutes a part of said power transmitting path, said control apparatus comprising:

a continuous-transmission control device including, a first shifting control portion that controls a speed ratio of said differential portion, so as to prevent a change of a speed of said engine due to a change of an input speed of said transmission portion upon a shifting action of said transmission portion, and a second shifting control portion that controls the speed ratio of said differential portion independently of said shifting action of said transmission portion, wherein said continuous-transmission control device selectively activates said first shifting control portion and said second shifting control portion, on the basis of a manner in which an overall speed ratio of said transmission mechanism is changed, and wherein when an amount of change of the overall speed ratio is greater than a first predetermined value or a rate of change of the overall speed ratio toward a target value thereof is greater than a second predetermined value, the continuous-transmission control device performs a non-continuous change of the overall speed ratio with the second shifting control portion by adding an amount of change of the speed ratio of the differential portion to an amount of change of the transmission portion.

4. The control apparatus according to claim 3, wherein said continuous-transmission control device activates said first shifting control portion when the overall speed ratio of said transmission mechanism is changed continuously, and activates said second shifting control portion when the overall speed ratio of the transmission portion is changed non-continuously.

5. A control apparatus for a vehicular drive system provided with a first transmission portion in the form of a continuously-variable transmission portion disposed as a continuously variable transmission in a power transmitting path through which an output of an engine is transmitted to a drive wheel of a vehicle, and a second transmission portion which constitutes a part of said power transmitting path and which is connected to said continuously-variable transmission portion, said control apparatus comprising:

a continuous-transmission control device which controls a speed ratio of said continuously-variable transmission portion upon a shifting action of said second transmission portion, in a control mode switchable between a continuous mode in which an overall speed ratio defined by a speed ratio of said continuously-variable transmission portion and a speed ratio of said second transmission portion is changed continuously, and a non-continuous mode in which said overall speed ratio is changed non-continuously, wherein said second transmission portion is a step-variable automatic transmission connected in series to said continuously-variable transmission portion, and wherein the continuous-transmission control device performs a non-continuous change of the overall speed ratio, when an amount of change of the overall speed ratio is greater than a first predetermined value or a rate of change of the overall speed ratio toward a target value thereof is greater than a second predetermined value, by adding an amount of change of a speed ratio of the differential portion to an amount of change of the step-variable transmission.

6. The control apparatus according to claim 5, wherein said continuously-variable transmission portion includes a differential mechanism operable to distribute an output of the engine to a first electric motor and a power transmitting member, and a second electric motor disposed in a power transmitting path between the power transmitting member and a drive wheel of a vehicle, said continuously-variable transmission portion being operable as an electrically controlled continuously variable transmission.

7. The control apparatus according to claim 1, wherein said second transmission portion is a step-variable automatic transmission.

8. The control apparatus according to claim 1, wherein said differential mechanism includes a differential-state switching device operable to place said continuously-variable transmission portion selectively in a continuously-variable shifting state in which said continuously-variable transmission portion is operable as said electrically controlled continuously variable transmission, and a step-variable shifting state in which the continuously-variable transmission portion is not operable as said electrically controlled continuously variable transmission.

9. The control apparatus according to claim 1, wherein said differential mechanism includes a differential-state switching device operable to place said differential mechanism selectively in a differential state in which said differential mechanism performs a differential function, and a locked state in which the differential mechanism does not perform the differential function.

10. The control apparatus according to claim 9, wherein said differential-state switching device places said differential mechanism in said differential state to place the continuously-variable transmission portion in a continuously-variable shifting state in which the continuously-variable transmission portion is operable as said electrically controlled continuously variable transmission, and places the differential mechanism in said locked state to place the continuously-variable transmission portion in a step-variable shifting state in which the continuously-variable transmission portion is not operable as said electrically controlled continuously variable transmission.

11. The control apparatus according to claim 8, wherein said continuous-shifting control portion activates said first shifting control portion or said second shifting control portion while said continuously-variable transmission portion is placed in said continuously-variable shifting state.

12. The control apparatus according to claim 9, wherein said continuous-shifting control portion activates said first shifting control portion or said second shifting control portion while said continuously-variable transmission portion is placed in said differential state.

13. The control apparatus according to claim 9, wherein said differential mechanism has a first element connected to said engine, a second element connected to said first electric motor and a third element connected to said power transmitting member, and said differential-state switching device is operable to place the differential mechanism in said differential state in which the first, second and third elements of the differential mechanism are rotatable relative to each other, and to place the differential mechanism in said locked state in which the first, second and third elements are rotated as a unit or the second element is held stationary.

14. The control apparatus according to claim 13, wherein said differential-state switching device includes a clutch operable to connect any two of said first, second and third elements of said differential mechanism to each other for rotating the first, second and third elements as a unit, and/or a brake operable to fix said second element to a stationary member for holding the second element stationary.

15. The control apparatus according to claim 14, wherein said clutch and said brake are released to place said differential mechanism in said differential state in which said first, second and third elements are rotatable relative to each other, and in which the differential mechanism is operable as an electrically controlled differential device, and said clutch is engaged to permit the differential mechanism to be operable as a transmission having a speed ratio of 1, or said brake is engaged to permit the differential mechanism to be operable as a speed-increasing transmission having a speed ratio lower than 1.

16. The control apparatus according to claim 13, wherein said differential mechanism is a planetary gear set, and said first element is a carrier of said planetary gear set, and said second element is a sun gear of the planetary gear set, while said third element is a ring gear of the planetary gear set.

17. The control apparatus according to claim 16, wherein said planetary gear set is of a single-pinion type.

18. The control apparatus according to claim 8, wherein said differential-state switching device switches said continuously-variable transmission portion between said continuously-variable shifting state and said step-variable shifting state, on the basis of the output of said engine.

19. The control apparatus according to claim 8, wherein said differential-state switching device switches said continuously-variable transmission portion between said continuously-variable shifting state and said step-variable shifting state, on the basis of an output torque of said engine.

20. The control apparatus according to claim 8, wherein said differential-state switching device switches said continuously-variable transmission portion between said continuously-variable shifting state and said step-variable shifting state, on the basis of a running speed of the vehicle.

21. The control apparatus according to claim 2, wherein the vehicle is provided with an accelerator pedal, and said continuous-transmission control means activates said second shifting control portion when the overall speed ratio of said transmission mechanism is changed non-continuously as a result of an operation of said accelerator pedal.

22. The control apparatus according to claim 2, wherein said second transmission portion is a step-variable transmission, and the vehicle is provided with a shifting device including a manually operable shift member to control a shifting action of said step-variable transmission, said continuous-transmission control means activating said second shifting control portion when the overall speed ratio of said transmission mechanism is changed non-continuously as a result of an operation of said manually operable shift member.

* * * * *